(12) United States Patent
Holtzberg

(10) Patent No.: US 6,344,160 B1
(45) Date of Patent: *Feb. 5, 2002

(54) METHOD FOR MOLDING COMPOSITE STRUCTURAL PLASTIC AND OBJECTS MOLDED THEREBY

(75) Inventor: Matthew W. Holtzberg, Ringwood, NJ (US)

(73) Assignee: Compcast Technologies, LLC, Barnegat Light, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 09/212,077

(22) Filed: Dec. 15, 1998

Related U.S. Application Data

(63) Continuation-in-part of application No. 08/877,410, filed on Jun. 16, 1997, now Pat. No. 6,103,156, and a continuation-in-part of application No. 08/714,813, filed on Sep. 17, 1996, now Pat. No. 5,849,229.

(51) Int. Cl.$^7$ .............................. B29C 1/14; B29C 39/02
(52) U.S. Cl. ................... 264/102; 264/219; 264/236; 264/299; 264/313; 264/317; 264/319
(58) Field of Search .................. 264/102, 101, 264/313, 317, 257, 258, 40.6, 219, 220, 225, 226, 227, 236, 299, 319, 331.13, 331.15

(56) References Cited

U.S. PATENT DOCUMENTS

| | | | |
|---|---|---|---|
| 3,046,147 A | | 7/1962 | Hathaway, Jr. et al. |
| 3,222,443 A | | 12/1965 | Dames, Jr. et al. |
| 3,504,079 A | | 3/1970 | Hall |
| 3,975,479 A | | 8/1976 | McLean et al. |
| 4,320,079 A | | 3/1982 | Minnear et al. |
| 4,355,128 A | * | 10/1982 | Mercer |
| 4,403,066 A | | 9/1983 | Brode et al. |
| 4,578,448 A | | 3/1986 | Brode et al. |
| 4,588,420 A | | 5/1986 | Charvat |
| 4,677,020 A | | 6/1987 | Takagi et al. |
| 4,708,836 A | | 11/1987 | Gain et al. |
| 4,826,645 A | | 5/1989 | Angus |
| 4,848,292 A | | 7/1989 | Holtzberg |
| 4,990,292 A | | 2/1991 | Hattori et al. |
| 5,045,251 A | * | 9/1991 | Johnson |
| 5,084,504 A | | 1/1992 | Sano et al. |
| 5,176,864 A | * | 1/1993 | Bates et al. |
| 5,179,155 A | | 1/1993 | Sano et al. |
| 5,213,747 A | | 5/1993 | Lippert |
| 5,280,053 A | * | 1/1994 | Dearlove et al. |
| 5,849,229 A | | 12/1998 | Holtzberg |
| 6,103,156 A | * | 8/2000 | Holtzberg ............... 264/102 |

FOREIGN PATENT DOCUMENTS

| | | |
|---|---|---|
| GB | 1004339 | 9/1965 |
| JP | 61-181617 | 6/1985 |
| WO | WO 98/12033 A | 3/1988 |

* cited by examiner

*Primary Examiner*—Mathieu D. Vargot
(74) *Attorney, Agent, or Firm*—Hoffman & Baron, LLP

(57) ABSTRACT

A method for molding composite structural plastic components is disclosed wherein such components are cast from a polymerizable thermoset or thermoplastic composition in a conventional metalcasting mold. In the instant invention, a low viscosity thermoset or thermoplastic composition having reinforcing fibers distributed therein is poured into conventional metalcasting molds, obviating the need for high heats and pressures associated with injection or compression molding of composite materials as taught in the prior art. In the case of a thermoset resin, the object to be fabricated is fully cured by the action of a catalyst at relatively low exothermic resin temperatures. In the case of a thermoplastic resin, curing is generally achieved independently of high added heat and pressure. If using a thermoplastic such as nylon 6 in the present invention, a preferred method of use involves the addition and combination of fiber reinforcements while the nylon 6 resin is being manufactured. The process for manufacturing nylon 6 involves three components: a monomer (i.e. caprolactam), an activator and a catalyst. The typical activator is HDI-caprolactame pre-polymer and caprolactam, and the typical catalyst is aliphatic cyclic amide, sodium salt. Typical activator and catalyst ratios are 0.50–3% by weight. Components used in the production of thermoplastic resins are often available in a solid form which must be liquefied so as to be suitable for pouring into a mold. One method of liquefying solid forms of caprolactam requires melting of the monomer into a liquid and then using a catalyst and activator to complete chemical transition into a flowable thermoplastic resin and ultimately a solidified part. The catalyst and activator complete the cure into a solid nylon 6 part without the need for high added heat or injection pressures. Caprolactam monomer is also available in a molten form and nylon casting activators can be acquired in liquid form, showing similar performance in the casting process and in the finished parts. However, all three components (monomer, activator and catalyst) are usually manufactured in a solid flake form. Whether thermoset or thermoplastic, the selected resin has a sufficiently low viscosity so as to allow mixture of the resin with high percentages of reinforcement fibers and suspension of the reinforcement fibers therein. During mixing and curing, the resin's viscid state prevents the fibers from settling or grouping, thereby achieving desirable dispersion of the fibers therein. This method furthermore enables fabrication of high quality composite structural plastics in traditional soft molds and molds produced using rapid prototyping techniques. The mold itself may be made by constructing a pattern of the object to be molded and casting the mold in a liquid or soft formable material such as wax, plastic rubber or spray metal which may use extractable cores therein. Structural plastic molds made with this process can be used for prototype or production purposes. This economical molding technique permits production of quality structural molds and plastics utilizing low cost molds heretofore used only in the prototyping of plastic visual aids.

86 Claims, 15 Drawing Sheets

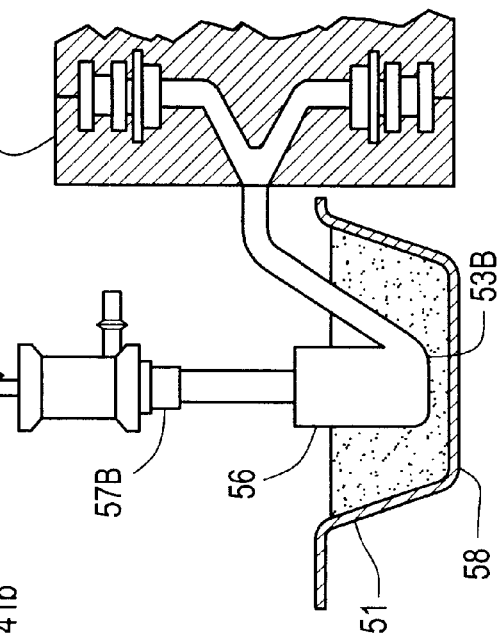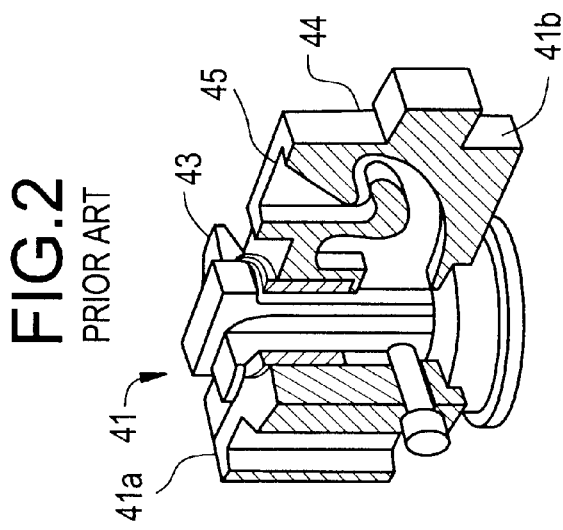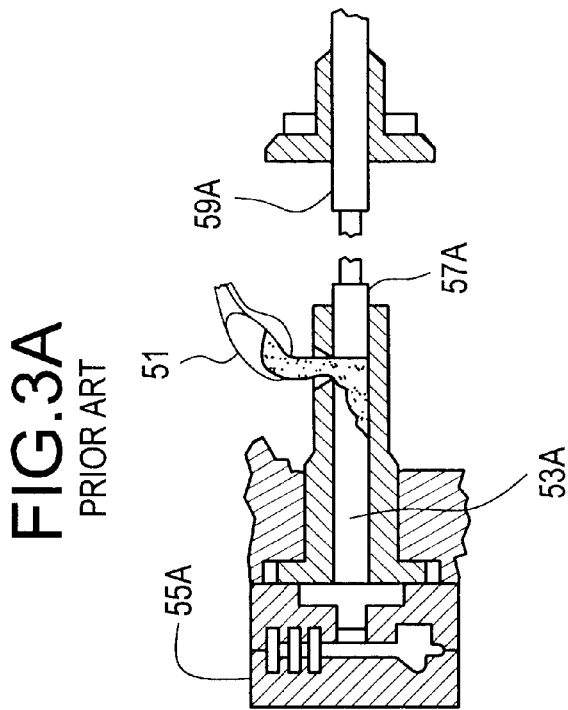

METHOD OF CASTING STRUCTURAL PLASTIC COMPONENTS (THERMOSETS)

METHOD OF CASTING STRUCTURAL
PLASTIC COMPONENTS (THERMOPLASTICS)

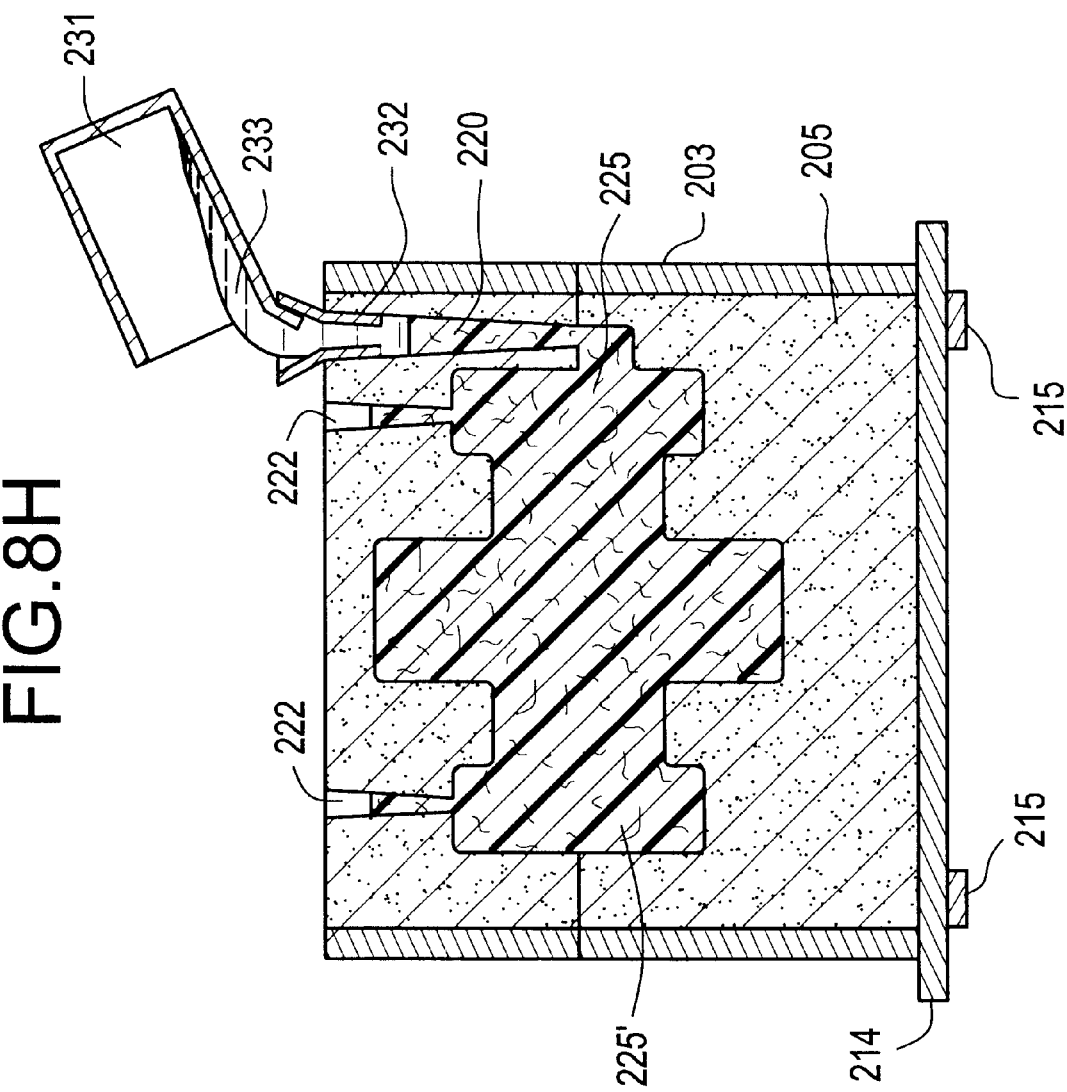

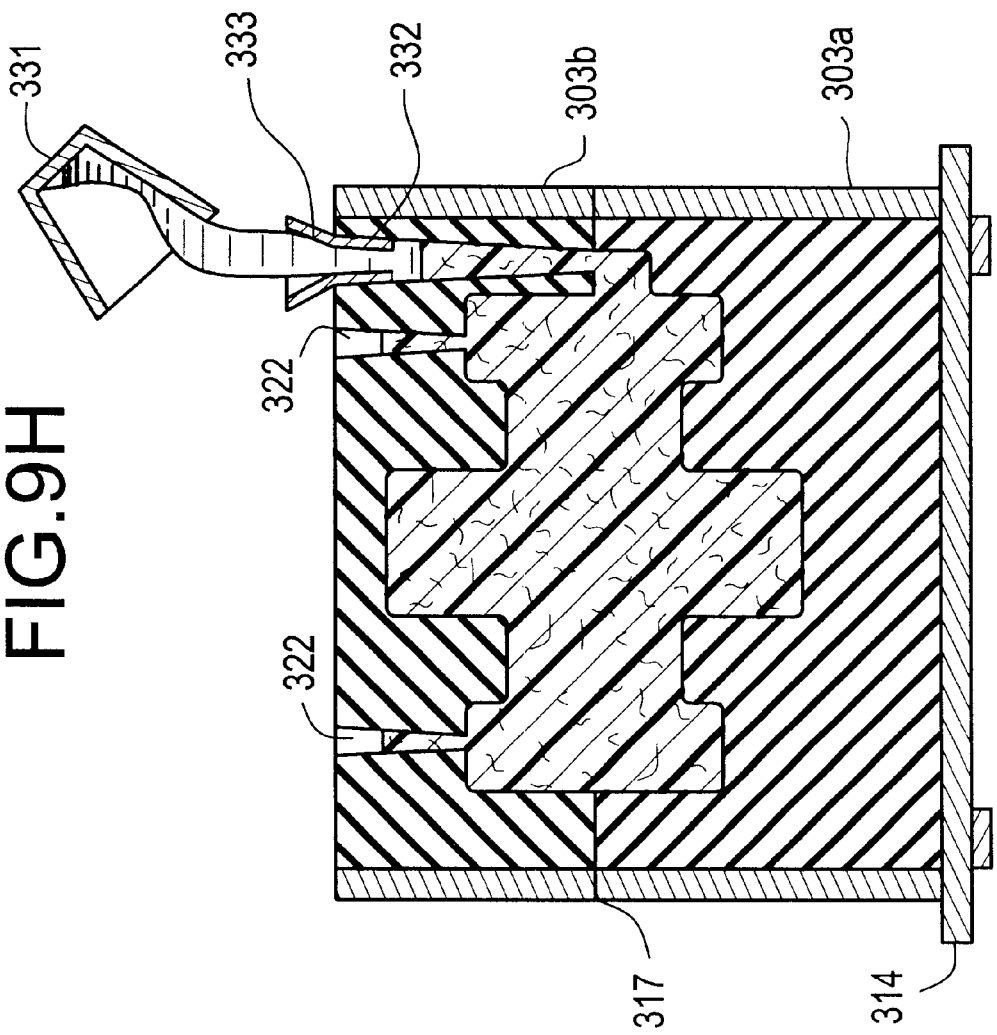

METHOD FOR MOLDING COMPOSITE STRUCTURAL PLASTIC AND OBJECTS MOLDED THEREBY

This application is a continuation-in-part (CIP) application under 37 C.F.R. §1.53(b)(2) of U.S. application Ser. No. 08/714,813 filed Sep. 17, 1996, now U.S. Pat. No. 5,849,229 and U.S. application Ser. No. 08/877,410 filed Jun. 16, 1997, now U.S. Pat. No. 6,103,156 the disclosures of which are incorporated by reference herein as if provided in their entirety.

FIELD OF THE INVENTION

This invention relates to a method of molding composite, structural plastics and the objects fabricated thereby. In particular, this invention relates to a method of casting plastic commercial components in conventional metalcasting molds without the need for injection or compression molding. This invention further relates to the rapid fabrication of prototypes in composite, structural plastics using conventional soft tooling or rapid prototyping techniques.

BACKGROUND OF THE INVENTION

The use of molds to create parts of varying size, quality and implementation pervades the industrial landscape. Over 4000 metal casters cast over 32 billion pounds of metal annually in metal foundries all over the world. In the foundries, metals are processed into commercially viable shapes by melting and pouring a molten metal into a mold. In this manner, structural items can be fabricated from steel, iron, copper, aluminum and like materials for a virtually limitless variety of applications.

Selection of a specific metalcasting process depends upon several factors, including, without limitation, the metal or alloy selected, casting size and complexity, surface finish, dimensional tolerances, production quantities and cost constraints. In addition, selection of a mold must anticipate whether the process uses expendable molds which are used only once and then discarded (i.e. in sand casting operations) or metal molds intended for repeated use (i.e. as used in permanent molding and diecasting). No matter what metalcasting process is used, however, all processes share two main objectives: the pattern must be removable from the mold without damage, and the casting must be removable from the mold or die without damage to either of the die or the casting (see 1996 CD&A Reference handbook). Various metalcasting processes are described hereinbelow.

1. Conventional Metalcasting Processes:
   a. Sand Casting

Sand casting metal is the backbone of several predominant industries, such as the automotive industry, because the materials and the tooling used in the process are inexpensive and rapidly produced. More than 80% of all castings made in the United States are produced by green sand moldings (see 1996 CD&A Reference handbook). The term "green sand" denotes a mixture of raw sand and a binder that has been tempered with water.

Sand molding is a multipurpose metal-forming process in which a pattern is made of wood, metal or plastic based upon the design specifications of the casting. In a conventional sand casting process illustrated in FIG. 1A, a pattern 10 is usually constructed in two parts which include a bottom part 10a and a top part 10b to allow ease of pattern removal from a mold. Parts 10a and 10b are aligned with each other using a plurality of registration pins 13.

Referring to FIG. 1B, bottom part 10a of the pattern is placed upside down on a molding board 16. In this way, the pattern defines a desired shape within a bottom half 18a of a mold 18. The bottom half 18a of mold 18 is then filled with green sand 19 as shown in FIG. 1C. Sand 19 is compacted firmly around and over the pattern by manual or mechanized compression means, such as a ram 21. The bottom half 18a of mold 18 is then inverted and set on a board or pallet 24, and molding board 16 is removed therefrom, as seen in FIG. 1D. Top part 10b of the pattern is aligned with bottom part 10a and set using a plurality of alignment pins 26. The separation of the pattern parts defines a recognizable parting plane 27 therebetween such that a shape is defined in the top half 18b of mold 18 that is substantially symmetrical to that defined in the bottom half.

As shown further in FIG. 1E, the top half 18b of mold 18 is filled with sand 19 which is then compacted over and around the top part 10b of pattern 10 with ram 21. A vertical channel or sprue 27 is cut into the top half 18b of mold 18 to provide an ingress for pouring molten metal into a mold cavity. Mold 18 is then parted along parting plane 27, and pattern 10 is removed therefrom.

As depicted in FIG. 1F, a horizontal channel or runner 29 is cut in the lower half 18a of mold 18 so as to be in communication with sprue 27 to accommodate flow of molten metal therethrough. If it necessary to compensate for metal shrinkage during the process, one or more risers 31 can also be cut into the mold. As further illustrated in FIG. 1G, a sand core 33 is set in place and positioned using core prints 14 that are created in the mold by pattern 10 (shown in FIG. 1A). Mold 18 is finally closed thereafter and ready to produce a casting.

Sand casting can be used to mold a wide range of materials having considerable complexity. The low tool and die costs associated with this method, coupled with the ability to produce varying lot sizes of materials (i.e. a few pieces or huge quantities can be produced) make sand casting desirable for a wide range of applications. However, a significant disadvantage of this type of molding process is that the mold is a single use mold which inhibits high volume production. Furthermore, the use of binder within the sand anticipates the release of toxic substances into the environment upon removal of the binder and disposal thereof. The low tool and die costs are compromised by high labor and finishing costs which are incurred during the production cycle.

b. Permanent Molding

In permanent mold casting (also known as "gravity diecasting"), a metal mold consisting of at least two parts is repeatedly used for components that require high volume production. A conventional permanent mold arrangement is illustrated in FIG. 2. Up to 99% of such molds currently in use are made of steel or plaster; however, these mold molds may also be constructed of cast iron, graphite, copper or aluminum.

Molten metal is poured into a mold 41 having mold halves 41a and 41b and a core 43. Mold 41 is a permanent mold wherein the metal cools more rapidly than in a sand mold and produces a finer grain structure with enhanced mechanical properties and tighter dimensional tolerances. As can be seen from FIG. 2, mold 41 emulates the sand casting procedure described hereinabove, except that a material such as metal or plaster is used in place of sand. In this process, a mold configuration 44 is formed in the mold which corresponds to the desired configuration of the cast product. A sprue 45 is defined for pouring of molten metal into the mold cavity defined by mold configuration 44.

Although the permanent mold process has moderate labor costs and low finishing costs, the problems associated with this procedure include limitations on casting size coupled with high initial tooling costs, which make the process prohibitively expensive for low production volumes. In addition, several alloys and shapes are not amenable to permanent mold casting due to part line location, complex undercuts in the design or difficulty in removing the casting from the mold. Lot size is limited to large quantities, making the process untenable for small scale molding. Furthermore, mold coatings which are often required to protect the mold from erosion, cracking and other forms of metal degradation can deleteriously effect surface finish.

c. Diecasting

Diecasting is a permanent molding process is primarily for high production of intricately-designed components cast from zinc, lead, tin, aluminum, copper or magnesium. There are two types of diecasting machines: cold chamber (illustrated in FIG. 3A) and hot chamber (illustrated in FIG. 3B). In either method, a molten alloy 51 is manually or automatically poured into a shot well 53A or 53B and injected into a die 55A or 55B under pressure. The locking force in diecasting machine operation keeps the die halves firmly closed against the injection pressure exerted by a plunger 57A or 57B as the plunger injects the molten metal.

As further shown in FIG. 3A, during cold chamber diecasting, molten metal is held at a constant temperature in shot well 53A prior to high-pressure injection thereof by piston 59A into die 55A. The cold chamber method is primarily used with metals of higher melting temperatures, such as aluminum and magnesium. Conversely, as shown in FIG. 3B, during hot chamber diecasting, molten metal is held in a temperature-controlled holding pot 58 and automatically discharged through a port 56 located at the top of shot well 53B. Discharges occur between each high-pressure injection of the molten metal to die 55B. The hot chamber method is primarily useful with those metals having low melting temperatures, such as zinc alloys.

Either form of the diecasting process allows part designers to use complex designs and cast-in inserts of other materials, such as steel, iron, brass and ceramics. However, the material used for the cast components themselves is limited to a narrow choice of materials such as zinc, aluminum, brass and magnesium. This method, those most economical where applicable, includes high tool and die costs and is only practical for production of large quantities of components.

d. Investment Casting

In an investment casting process, shown in FIG. 4, a ceramic slurry is poured around disposable pattern typically formed of paraffin waxes or plastics. The slurry is allowed to harden to form a disposable mold, and the pattern is destroyed upon melting during the firing of the ceramic mold. Later, molten metal is poured into the ceramic mold. After the metal solidifies, the mold is broken to remove the casting therefrom.

Two processes are generally used to produce investment casting molds: the solid mold and the ceramic shell method. The ceramic shell method dominates the use of this production technique and is therefore illustrated as a series of discrete steps in FIG. 4. Wax is injected into an aluminum die to form a pattern that replicates the desired casting configuration (1). For smaller castings, several wax patterns are affixed to a common tree so as to accommodate larger lot sizes (2). The wax components are then dipped into a liquid ceramic slurry (3) and coated with dry refractory sand until a shell is developed thereon (4). The wax is then melted out in a furnace (5) wherein the shell is hardened, producing a single-piece shell mold (6). Molten metal is poured into the ceramic mold (7), and the shell is broken away after the metal has cooled and solidified (8). The solidified metal component may be subjected to further finishing processes (9) and inspected thereafter (10) to assess the quality of the component and its applicable uses.

Because the wax pattern can be made with internal passageways to create complex castings, the investment casting process enables mass production of complex shapes and reproduction of fine details with tighter dimensional tolerances. However, initial tooling costs for larger castings are extremely high, and the size and weight of components which can be produced by this method are limited, imposing escalated time and financial burdens on the manufacturer.

e. Shell Molding Process

In a shell molding process, the steps of which are shown in FIG. 5, a thermosetting resin-bonded silica sand 62 is placed on a heated pattern 65 for a predetermined length of time (1). Heating cures the resin, causing the sand grains to adhere to each other to form a sturdy shell that constitutes one-half of a thin-shelled mold 66 (2). Upon ejection of the pattern 65 from the shell 66 (3), the shell is manually joined with its complementary other half to make a complete shell mold 68 (4).

Castings made by this method typically exhibit more accurate dimensional tolerances than conventional sand castings with a high degree of reproducibility. A wide choice of materials can be used in this process for the production of moderately complex designs, with the exception of low carbon steels. Tool and dies costs are low, yet the process requires larger lot sizes to be practicable. Moderate-to-high labor and finishing costs are also associated with this method.

f. Lost Foam Casting

Lost foam casting is also known as expanded polystyrene (EPS) molding, expendable pattern casting, evaporative foam casting, the full mold process, the cavityless casting process and the cavityless EPS casting process. In a lost foam casting process, the steps of which are shown in FIG. 6, a one-piece pattern 71 is made of expanded polystyrene and covered with a thin refractory coating (1). Pattern 71 is embedded in unbonded sand 72 within a vented container 73 (2). Molten metal that is poured into a sprue 73a vaporizes the polystyrene instantaneously (3), quickly reproducing the pattern to form a finished product 78 (4). Gases 76 which are formed from the vaporized pattern escape through the pattern coating, sand 72 and the vents of container 73.

This process is advantageous in that is requires no cores and enables production of complex, close-tolerance castings with near net shape. Furthermore, castings can be made by the lost foam process with no parting lines and with a substantial reduction in capital investment and operating costs. However, pattern handling requires considerable care, resulting in labor costs that are very high and further limiting the types of materials that can be used.

2. Selection of Metalcasting Process Methods

Molding systems and casting processes other than those described hereinabove are used to make metalcastings, such as vacuum molding and use of centrifugal casting machines. However, when all of these processes are considered together, no one process emerges as a dominant low cost production method suitable for casting a wide array of configurations. Furthermore, no one method enables easy transition among production objectives. The employed processes must often be changed due to a change in volume production or material selection, even if other casting specifications remain the same. The inability to employ a single system or process to produce a broader spectrum of castings maximizes operating and maintenance costs, especially if the required specification and volume cannot be met by the system or process that is already in place. Generally, specialization always leads to higher costs and lengthier production times, and the same is true with traditional metalcasting methods.

3. Modem Substitution of Plastics

In light of the problems associated with conventional metalcasting procedures, injection and compression molders and fiber reinforced plastics have become increasingly utilized in the production of articles once exclusively made through such procedures. Both injection molding and compression molding processes have been used to provide fiber-reinforced equivalents of metal objects. In both of these processes, resin and a reinforcing fiber are combined and formed into a shape that can be molded. While the material is in the mold, high added heat melts the resin and ensures a complete transition into a fully cross-linked and cured polymer. This high added heat is applied in concert with sufficient pressure to force the material into a mold. Typical temperatures reach ranges of 250–650° F. and typical pressures reach 150–5000 psi.

An increasing number of businesses are molding composite structural plastics to produce objects in place of equivalent metal parts. Molding the plastics to achieve net shape, weight reduction, corrosion resistance and reduced energy costs is desirable in many industries not only to reduce production costs but also to improve performance of the molded objects. As a result, the metalcasting industry is slowly, yet definitively losing ground to more modern synthetic materials and the use thereof in a wide variety of industrial applications.

a. Prototyping

In view of the far-reaching and advantageous application of modern plastics, many industries, including the automotive industry, covet the ability to bring a product from conception to full-scale product development in the shortest time span. In most cases, this involves an early step of producing at least a non-functional, visual display prototype of the object to be manufactured. Prior to recent computer developments in prototyping, wood forms would be machined to provide the form of the object so that a wax, plastic or rubber pattern could be made quickly in order to produce at least a handful of three-dimensional models prior to manufacture. Such models have always been unfilled plastics, incapable of serving as structural prototypes.

Today, computer-aided design (CAD) is frequently employed for at least rapid visualization of an article to be manufactured. While enormously useful to engineers studying the best production methods for the object, CAD has been further improved so as to actually produce a three-dimensional object for handling, visualization and limited suitability testing. These CAD techniques include stereo lithography (SLA), laminated object manufacturing, selective laser sintering (SLM), fused deposition modeling (FDM) and solid ground curing (SGC). These techniques use powder, liquid or sheets of polymers or other materials which are sequentially formed together, eventually producing a prototype of the desired object. Hereinafter, all of these CAD techniques are collectively referred to "rapid prototyping techniques".

For virtually all of the prototype techniques, including conventional soft tooling and state-of-the-art CAD prototype production methods, the result is a prototype with relatively low temperature resistance and strength. While extremely useful at the early visual stage of product development, these prototypes cannot be used to fully evaluate the functionality of a finished product. A typical example of current prototype fabrication is found in the automotive industry. If a prototype for a nylon intake manifold is required, for example, an initial model would be made using a rapid prototyping technique such as SLA. However, to test the functionality of the prototype, automotive design engineers then have to make a steel mold and inject nylon to produce the same design in plastic so that the prototype will withstand high temperatures and stresses. In effect, the designer is repeating the prototyping procedure at great expenditures of money and time.

b. Industrial Applications

The automotive industry is a primary example of the inevitable conversion from metalcasting to plastic part production to optimize performance of molded parts while reducing the production costs associated therewith. Thus, throughout this specification, reference will be made to this ubiquitous industry. However, it is understood that the present invention methods and systems, and the products rendered thereby, are amenable to a limitless number of applications in a multitude of industries around the world.

Molded nylon intake manifolds, for example, already constitute 5% of the relevant market, and manufacturers have indicated that such manifolds will eventually replace the conventional aluminum designs currently in use. However, the process of conversion from aluminum to plastic production has been slow because of the high cost for prototype and production injection molding tooling and associated process equipment. The conversion to plastic requires production of new, custom-made steel molds which are prohibitively expensive for most producers. Therefore, a molder must wait until the automaker allocates a budget to pay for this very expensive tooling.

During the average development program, it takes 10–12 weeks to produce a steel mold. Due to the high temperatures (i.e. 500–600° F.) and pressures (i.e. 3000–5000 psi) required with nylon injection molding, molds must be machined out of tool steel. Along with the development of the manifold has been the development of a method to produce the intricate internal passages previously created with sand cores when casting manifolds in aluminum. The method used with injection molding nylon is known as the lost core process. It uses a soft metal such as tin-bismuth as the soluble core material. The metal is first melted, and then injection molded in a steel mold to produce the core. A steel mold is required due to the high melt temperature of the metal and the stress it places on the mold material when injected. The average development program consumes three steel injection molds for the nylon manifold and three steel molds to mold the expendable tin-bismuth cores. Costs for the development program alone can exceed $1 million just for prototype tooling.

Since inception, injection molded manifolds have used the lost core process to provide rather simple manifold design configurations. As engineers have embraced nylon injection molding, the complexity of the designs and their core packages have increased significantly. Engineers and molders have experienced extreme difficulty not only in preventing shifting of the tin-bismuth cores, but also in melting out the cores, thereby creating a crisis for the nylon manifold business and the automotive industry. The current manifold designs are so complex that the core package weights are extremely dense and heavy. A popular V8 engine manifold, for instance, has 160 lb of metal in its core package, causing the core to shift in the mold as a result of its own mass. This anomaly is further aggravated by the high injection pressures of the nylon molding compounds.

In addition, since nylon cannot be injection molded in thick cross-sections, the injection molded manifolds can only have thin wall thicknesses (i.e 3–4 mm), significantly less than the thicknesses of a conventional sand cast aluminum manifolds (i.e 6–10 mm). The cost of the injection molded materials also mandates thin wall designs. As a result, injection molded manifolds are much noisier than their aluminum counterparts in that they do not dampen the noise, vibration and harshness (NVH) generated by the engine as well as cast aluminum manifolds.

c. Comparison With Metalcasting

Injection molding plastics are similar in costs to diecast metals such as magnesium, yet magnesium and most structural injection-moldable plastics cost twice as much as cast aluminum. It is usually felt that injection molding is the lowest cost form of molding plastics and that casting is more expensive. Sand casting, however, is the slowest method of casting metals from a cycle-time standpoint, but the tooling is the least expensive. Diecasting is the fastest curing method, but the tooling is significantly more expensive and has a short life. In the past, where plastics have been cast, they always required the use of steel molds which is what prevented them from being costs effective with injection molding. Therefore, the need has been felt for a process which integrates the benefits of conventional metalcasting methods and the inherent performance advantages of plastics.

Being able to cast structural plastics using non-traditional plastic tooling has advantages over metalcasting aluminum, particularly in the rapidity of tooling production, the long life of the tooling and the significant cost savings in both the tooling and the materials. Cycle times for such a method of casting plastics are comparable to diecasting aluminum and injection molding plastics. In addition, the metal caster realizes significant cost savings by reclaiming the ability the ability to make the plastic compound in-house. For example, the ingredients which comprise a typical glass-reinforced nylon compound (i.e. the monomer, the catalyst, the fiber, etc.) if purchased separately, can result in a cost of $0.80–$0.90 per pound of compound. In comparison, a typical injection moldable grade nylon currently used to mold manifolds, already mixed and made available as a ready-to-use compound, can cost $1.25–$1.75 per pound of compound. Therefore, if cure of parts could be achieved as quickly as injection molding in molds that are as inexpensive as those used in sand casting or which can be rapidly fabricated at a lower cost than machined steel molds, then a low-cost method of producing plastic equivalents of metal casted objects would be obtained.

Bridging the Gap a. Prior Art Solutions

The desire to use more varieties and amounts of plastic materials arises from this need to use lower cost methods while retaining the structural integrity of the products made thereby. Plastics are amenable to fabrication in simple and complex forms, enabling volume production of various industrial components. An example is disclosed in commonly assigned U.S. Pat. No. 4,848,292 (the '292 Patent), which is incorporated by reference herein. The '292 Patent discloses a cylinder head and engine block assembly for an internal combustion engine wherein both the cylinder head and engine block are formed from a fiber-reinforced phenolic resin. The fiber reinforcement preferably includes fiberglass or graphite fibers having a length of about ½" to 1". The head and block are either injection or compression molded to achieve close tolerances, enhanced structural integrity and elimination of most secondary machining operations. In either process, dry resin powder and a reinforcing fiber are pre-mixed and formed into a shape that can be molded. Where injection molding is used, the phenolic molding compound is injected into the mold cavity at injection molding temperatures and pressures to fill the cavity and molding chamber.

A lightweight engine block and head assembly according to invention reduces overall engine weight by up to 60%, reduces noise, minimizes rust and corrosion and significantly reduces the duration and cost of manufacture by reducing the number of secondary machining operations that must be performed to give the assembly its finished shape (i.e. post-mold drilling of bores to accommodate correspondingly sized stud bolts). Composite molding times are significantly shorter than times required for conventional metalcasting, promoting mass production thereof. Additionally, the components are capable of maintaining higher horsepower for their weight than conventional metal parts. Such engines further effectively maintain their shape, dimensional stability and structural integrity at high operating temperatures and have a greater strength-to-weight ratio than metal.

Thus, the combination of a high mechanical strength (particularly at operating temperatures), thermal stability, fatigue strength and excellent compressive strength exhibited by structural composite plastic components makes the materials highly desirable for mass production and continued incorporation into mainstream production cycles. Such materials also exhibit excellent resistance to wear, corrosion, impact, rupture and creep, and components fabricated from such materials reliably operate in the presence of engine fuels, additives, oils and exhaust. Since these characteristics are amenable to various other application, manufacturers have identified the need to develop new prototyping and production programs which incorporate fabrication of a multitude of structural plastic designs and exploit their advantageous properties commercially.

b. Present Inventive Solutions

In co-pending and commonly assigned U.S. application Ser. No. 08/714,813, the disclosure of which is incorporated by reference herein, a method for molding composite structural plastics in molds traditionally used in foundries for molding metal parts is described. The same basic method can be employed to produce not only inexpensive prototypes utilizing soft tooling or rapid prototyping techniques, but also to form molds suitable for structural, prototype or final product fabrication. Such an application is disclosed in co-pending and commonly assigned U.S. patent application Ser. No. 08/877,410, which is also incorporated by reference herein. Thus, a low-cost and rapidly developed molded prototype part, or its commercial equivalent, can be used by design engineers not only to visualize the objects in a hands-on three-dimensional representation, but also to test the object in the actual environment to which the finished product is going to be exposed. Extremely important costs savings are realized both in fabrication of the prototype and in time saved in bringing a newly-conceived product to market.

Thus, it is desirable to combine the desirable characteristics of composite materials with conventional, readily available metalcasting procedures and molds to develop and implement a successful method which permits the use of conventional metalcasting molds to fabricate composite, structural plastic prototypes and products thereby. In addition, it is desirable to develop a material and casting process to produce a structural prototype having functional properties equivalent to those of a finished product using current soft tooling or rapid prototyping techniques, thereby reducing design cycle time and concurrently reducing the elapsed time between conception and market introduction

SUMMARY OF THE INVENTION

It is therefore an object of the invention to provide a method for molding composite structural plastics in conventional, readily available metalcasting equipment.

It is another object of the present invention to produce a structural plastic component t using conventional, readily available metalcasting equipment.

It is a further object of the present invention to permit molding of composite, structural plastics without the need for high temperature equipment for post-cure cycles.

It is yet another object of the present invention to permit molding of low cost and lightweight composite plastic equivalents to foundry-produced metal objects.

It is still another object of the present invention to reduce the amount of required machining of components after casting.

It is another object of the present invention to provide a method for utilizing soft tooling and modem rapid prototyping techniques in order to fabricate structural, composite plastic prototype parts.

It is still another object of the present invention to provide a simple, low-cost single step method for producing a prototype part having equivalent visual and structural characteristics to the actual part to be co commercially produced.

It is yet another object to reduce the viscosity of flowable resins and combine such resins with short-length reinforcing fibers so as to enable pouring of the combination into a conventional metalcasting mold.

A method for molding composite structural plastic components is disclosed wherein such components are cast from a polymerizable thermoset or thermoplastic composition in a conventional metalcasting mold. In the instant invention, a low viscosity thermoset or thermoplastic composition having reinforcing fibers distributed therein is poured into conventional metalcasting molds, obviating the need for high heats and pressures associated with injection or compression m molding of composite materials as taught in the prior art. Using metalcasting tooling and procedures heretofore used solely in the casting of production metal parts permits "no pressure" molding without high added heat. In the case of a thermoset resin, the object to be fabricated is fully cured by the action of a catalyst at relatively low exothermic resin temperatures. In the case of a thermoplastic resin, curing is generally achieved independently high added heat and pressure. With respect to either a thermoset or thermoplastic resin, the resin is brought to a viscosity sufficient to maintain suspension of a plurality of reinforcement fibers therein.

The invention furthermore discloses a method of fabricating high quality composite structural plastics in traditional soft tool molds and molds produced using rapid prototyping techniques. This economical molding technique permits production of quality structural molded plastics utilizing low cost molds heretofore used only in the prototyping of plastic visual aids.

BRIEF DESCRIPTION OF THE DRAWINGS

FIG. 2 shows a permanent mold used in permanent mold metalcasting process of the prior art.

FIGS. 3A and 3B show a cold-chamber diecasting machine and a hot-chamber diecasting machine, respectively, of the prior art.

FIGS. 8A to 8H shows a schematic representation of a plastic casting method of the present invention.

FIGS. 9A to 9H show a schematic representation of a soft tooling prototype according to a method of the present invention.

DESCRIPTION OF THE PREFERRED EMBODIMENTS

In the instant invention, low viscosity thermoset or thermoplastic resins in a liquid state are combined with reinforcing fibers, and the mixtures are poured into traditional casting molds, including those used in the conventional molding processes described hereinabove. The present invention teaches an economical molding technique that enables production of composite structural prototypes and commercial products using molding procedures that are currently employed in foundries with standard equipment and without costly heat treating equipment or post-mold cure cycles. As used herein, the terms "structural composite" and "structural plastic" will be used synonymously to mean functional components derived from selected composite materials.

Figure 1A:
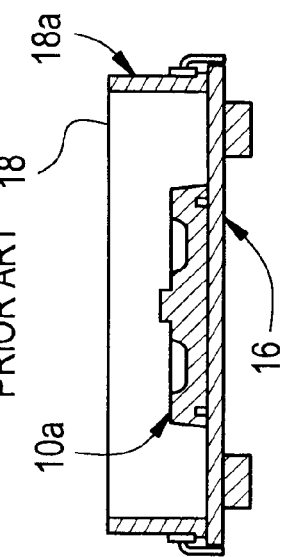
FIGS. 1A to 1G show a schematic representation of a sand molding metalcasting process of the prior art.
Figure 1B:
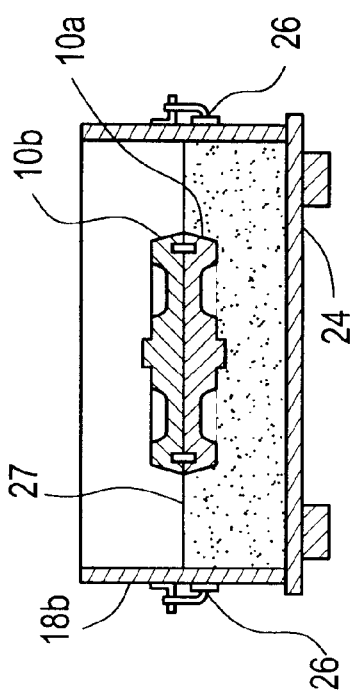
Figure 1C:
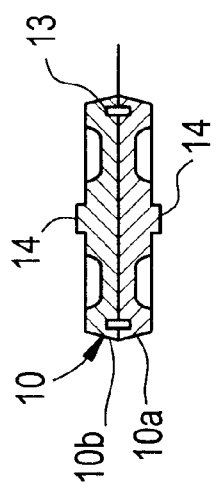
Figure 1D:
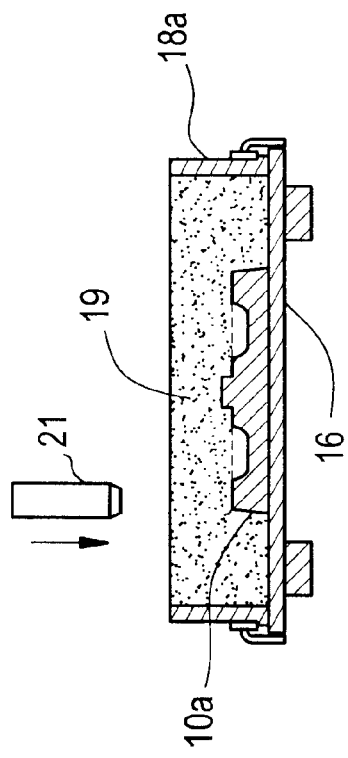
Figure 1E:
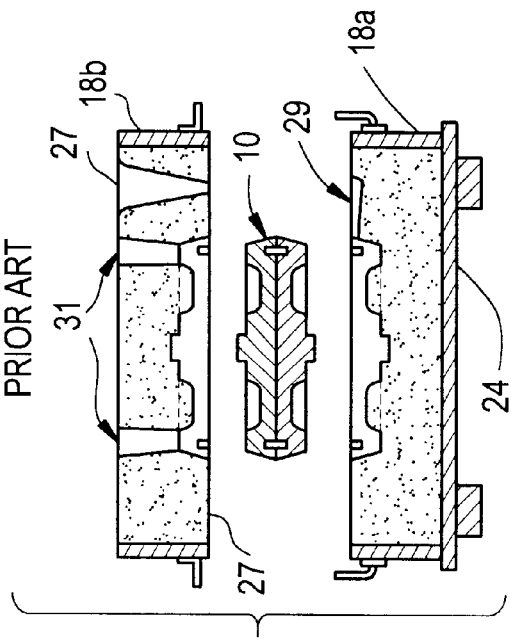
Figure 1F:
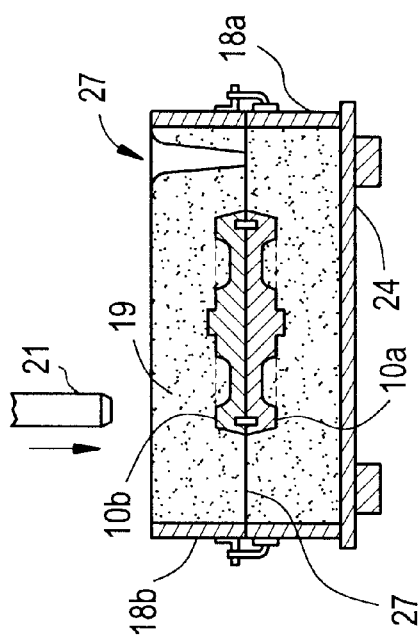
Figure 1G:
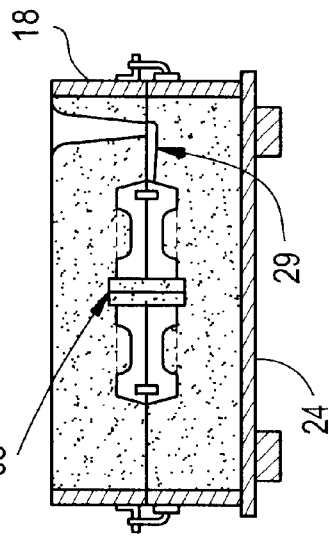
Figure 4:
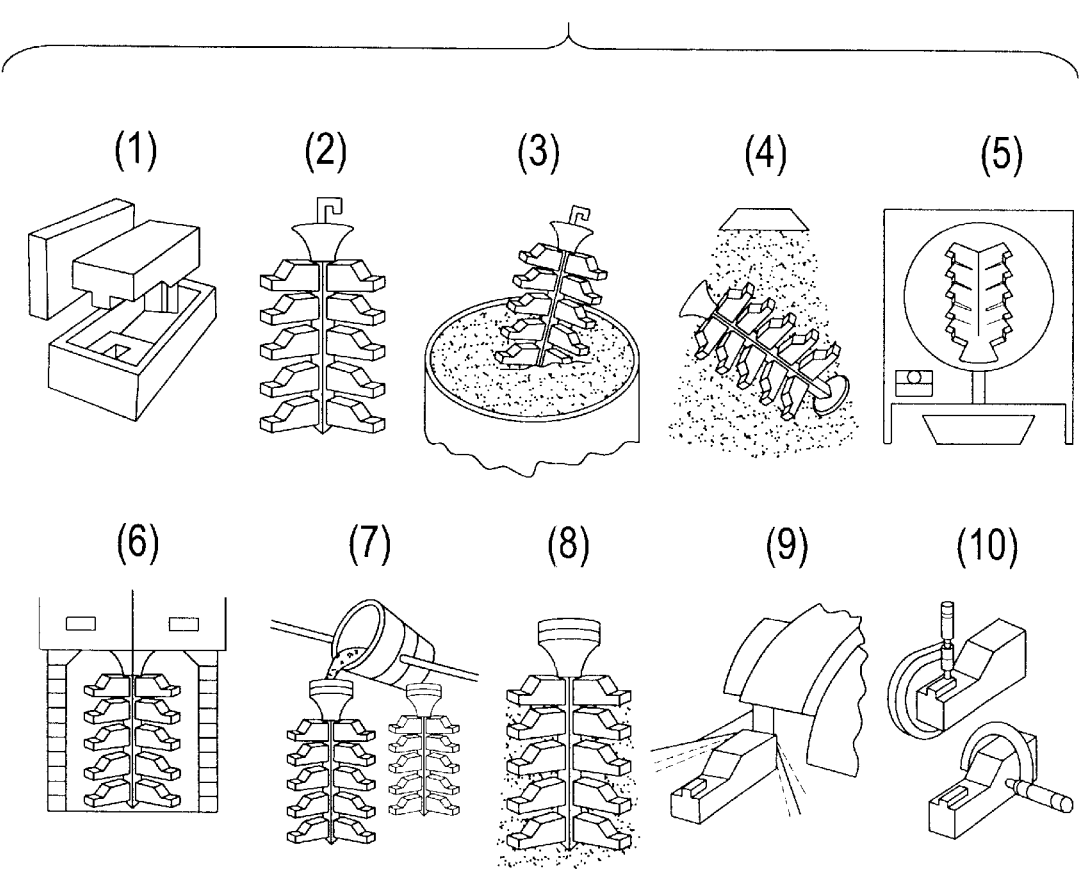
FIG. 4 shows a schematic representation of an investment casting process of the prior art.
Figure 6:
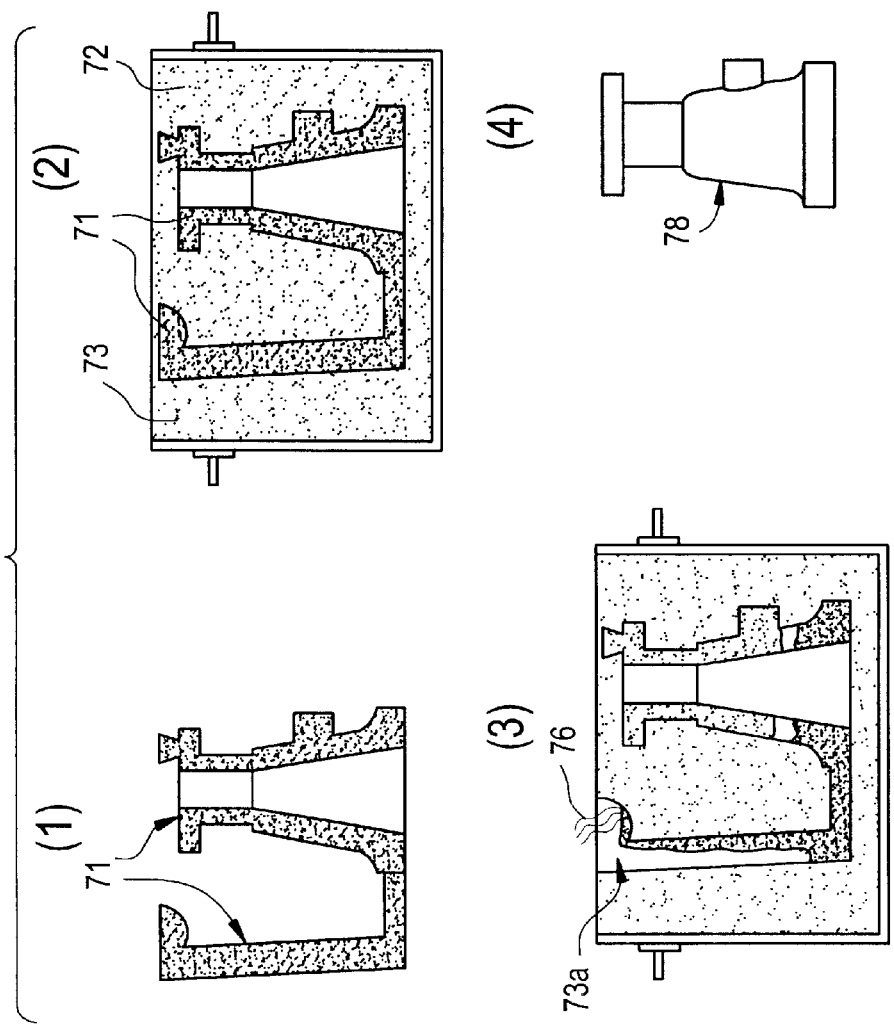
FIG. 6 shows a schematic representation of a lost foam casting process of the prior art.
Figure 5:
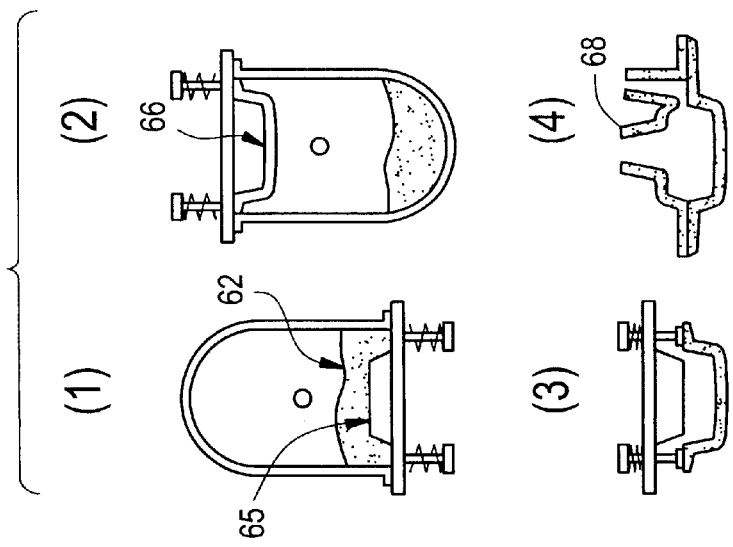
FIG. 5 shows a schematic representation of a shell molding metalcasting process of the prior art.
Figure 7A:
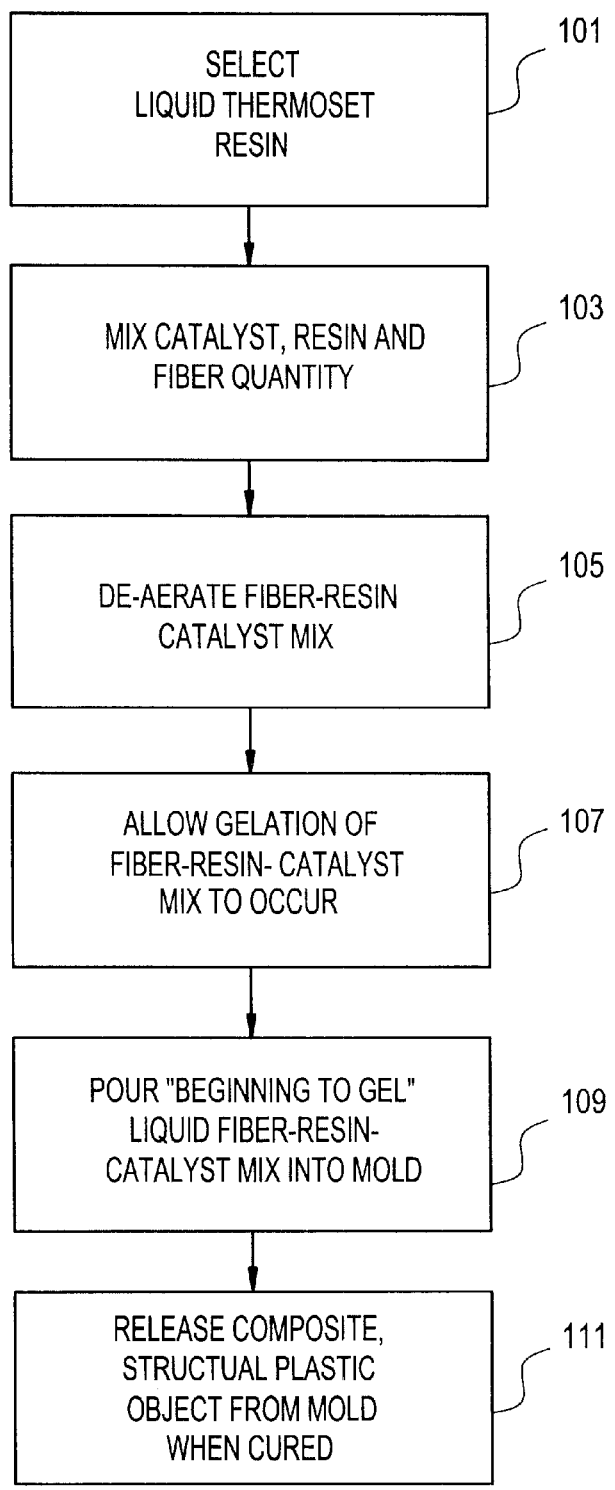
FIG. 7A shows a flowchart of the present invention method of casting structural plastic components in conventional metalcasting molds using a thermoset resin.
Figure 7B:
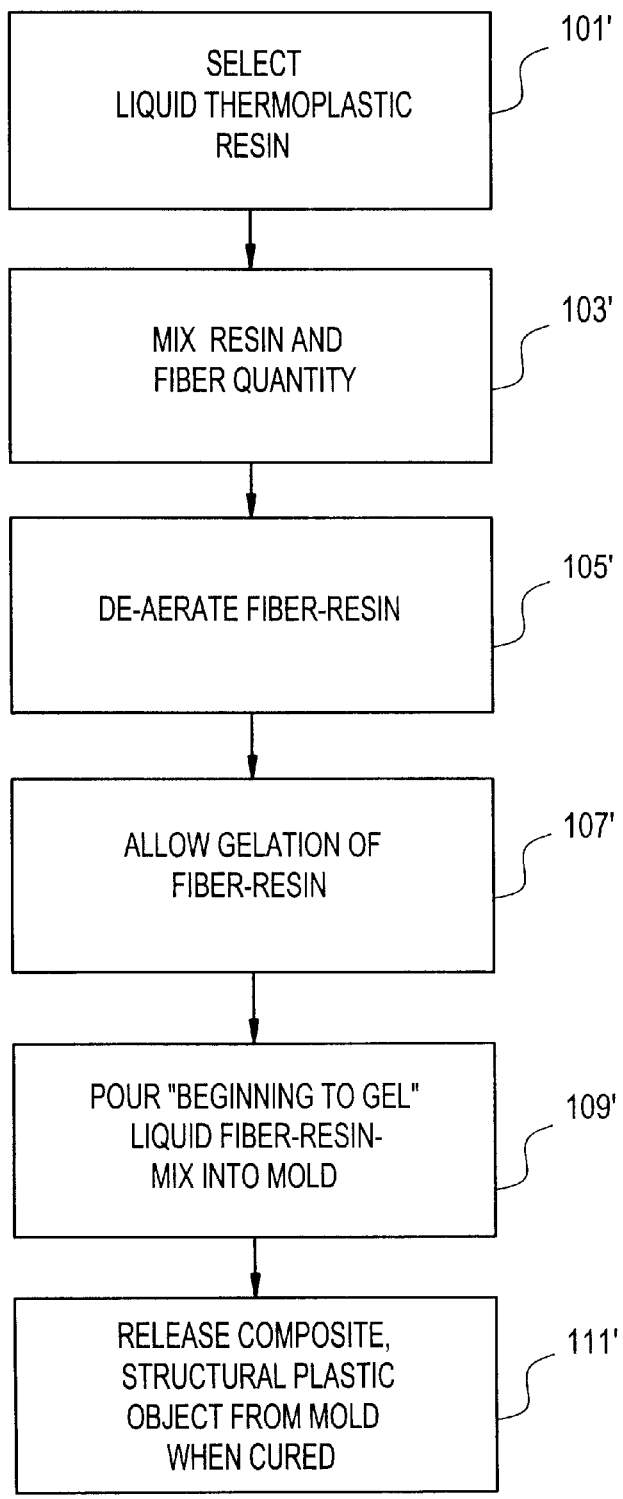
FIG. 7B shows a flowchart of the present invention method of casting structural plastic components in conventional metalcasting methods using thermoplastic resins.

Referring now to the figures, the preferred embodiments of the present invention can now be described. FIGS. 7A and 7B provide flowcharts illustrating the present invention method for molding composite structural plastics utilizing thermoset and thermoplastic compositions respectively.

Referring to FIG. 7A, at Block 101, the structural thermoset composite which will comprise the final molded component is selected. The specific thermoset selection is dependent upon several factors, such as the desired configuration and performance characteristics of the molded component as well as the actual application thereof.

As shown in FIG. 7A, a flowable thermoset resin is combined with a catalyst and a dry reinforcement fiber at Block 103. The sequence in which the components are mixed has no effect on the process (i.e. fibers and resin may be mixed before adding the catalyst, or catalyst and fibers may be mixed before adding the mixture to resin). Mixture of the components is effected by using mixing means such as an industrial paddle mixer to obtain a thorough integration of the components with one another. Care must be taken to ensure that the fiber is sufficiently dry so as to obtain minimum moisture content, preferably less than 100 ppm.

The selected resin has a sufficiently low viscosity so as to allows mixture of the resin with high percentages of fiber reinforcement, preferably achieving fiber loadings of 10–65% volume by weight. At such viscosity, the fibers are sufficiently suspended within the resin so as to achieve adequate dispersion therethroughout without settling of the fibers. Selected reinforcement fibers can be fiberglass, graphite, Kevlar® or ceramics. Relatively short fiber lengths are employed as compared with conventional resin transfer methods, with the fibers being milled or flaked at lengths of 1/16", 1/8" or 1/4" and widths between 10–40 microns inclusive, with 10 microns being a preferred width. It is essential to the present invention to utilize relatively short fiber lengths so as to effectively combine the fibers with the low viscosity resin. Such a combination results in a low bulk density compound that can be poured, rather than pushed under pressure. However, woven chopped, unidirectional, random and non-woven fibers may be added in selected regions of a mold for additional structural integrity.

Once a thermoset composition chemically cross-links into a cured and solidified shape, the composition cannot return to its original form. The thermoset resins that can be used include, but are not limited to, unsaturated polyester, phenolic, epoxy resin, urethane and vinyl ester resins. These compositions have low enough viscosity (i.e. 100–3,000 cps) to allow mixture of the resin with high percentages of fiber reinforcement material.

A preferred low viscosity thermoset resin for use in the present invention is phenolic resin, which exhibits high mechanical and thermal stability equal or superior to that of aluminum at operating temperatures. More specifically, resole phenolic are preferred because they are one-stage resins manufactured by heating phenol and formaldehyde using an alkaline catalyst. By "one-stage" is meant that the formaldehyde-phenol mole ratio must be greater than one, enabling resoles to cross-link in the presence of heat without the addition of more formaldehyde to promote cure. Resole phenolics may use either water or ethylene glycol as a solvent. Since phenolics are cross-linked through a condensation reaction, the use of ethylene glycol as a solvent is preferred to minimize the amount of water in the cure process.

Alternatively, resoles can be cured without additional heat through the addition of catalysts. As a suitable catalyst, resole phenolic generally require strong acids such as phosphoric acid and toluene sulfonic acid to effect a complete cure. Typical catalysts are 2–20% by weight, and typical glycol percentages by weight are 50% for the resin and 17% for the catalyst. The resin can be handled in virtually any manner for convenient dispensing, which handling methods are well known in the art. It is important to emphasize that with this method, the ingredients which are required to make the resin-fiber-catalyst compound can be separately purchased by the metal caster and formed into the compound thereby, alleviating much of the front end cost associated with acquiring moldable plastic materials.

Referring again to FIG. 7A, the resinous mixture of Block 103 is de-aerated at Block 105 to achieve sufficient viscosity for pouring of the mixture into a conventional mold. De-aeration is accomplished by agitating the mixture in a conventional manner, such as by rolling the mixture in a container, stirring the mixture, vibrating the mixture or combining these action until a sufficient viscosity it obtained. Additionally, the container which holds the mixture can also be subjected to a vacuum which not only promotes de-aeration, but also removes water from the mixture that is given off during the cure cycle. If a prototype is being fabricated using soft tooling, the mixture from Block 103 is de-aerated until the resin is at a viscosity sufficient for pouring of the mixture into a conventional soft tool mold such as a wax, plaster, plastic, spray metal or rubber mold.

At Block 107, the mixture of Block 103 is poured into the mold after passage of an amount of time sufficient to maintain suspension of the short reinforcement fibers therein, yet still permit flow of the mixture. Determination of the appropriate time span depends upon the percentages of catalyst used within the mixture. The mixture should not be poured into the mold cavity until its viscosity reaches the point at which it is just about to thicken through the cross-link process. In this manner, the fibers do not settle or become congested during pouring, thereby ensuring the desirable structural integrity if the molded component after cure is complete. Due to the exotherm that is released during polymerization, the temperature of the mixture is typically in the range of 100° F.–130° F. Typical gelation cycle times may be from 15 seconds to 8 hours, although the mixture may not enter the mold until the last seconds of the reaction, when sufficient viscosity is attained. For certain applications it may be desirable to heat the mixture and/or mold to a maximum temperature of +120 F in order to minimize the loss of heat created by the exothermic reaction.

At Block 109, the mixture is poured into a suitable foundry mold, such as sand, permanent, diecast, shell molds or the like as described hereinabove. Dispensing equipment such as automatic measuring dispensing equipment that is well known in the art may be used to fill the mold. As stated above, the mold may be pre-heated to accelerate curing. Alternatively, the mold may also be subjected to a vacuum to facilitate the complete filling of the mold during the pour of the mixture thereinto.

Finally, the mold is disassembled and the finished molded object is removed therefrom at Block 111. If required, a completed object formed from a thermoset may be subjected to a post-mold cure in an oven heated to +250 F for 1–2 hours to effect complete curing and moisture removal. No such post-mold cure is required for thermoplastic materials.

Referring now to FIG. 7B, a process similar to that illustrated in FIG. 7A is shown, except that the structural plastic component is formed from a thermoplastic resin selected at Block 101', rather than a thermoset resin. Thermoplastics differ from thermosets in that, like metals, thermoplastics can be re-melted and re-solidified after initial solidification. Typically, thermoplastics are always injection molded while thermosets are almost always compression molded. In their traditional commercial form, thermoplastics require high added heat and high pressures to melt the material (which typically comes in a pellet form), fill the mold and solidify it. Pellets are obtained by first melting a thermoplastic resin into a paste-like viscosity, then mixing the resin with chopped fiber in an extrusion or extrusion-type process. The mixture is finally cooled so the compound solidifies into a form that can be chopped into pellets sold by the producer.

To manufacture a thermoplastic part, an injection molding machine is required. An injection molding machine preheats the pellets and then plasticizes them for forcing them through a screw under high pressure and using high shear rates to soften the pellet. This increase in temperature ranges from about 150° F.–700° F., depending upon the type of thermoplastic, and thereby lowers the viscosity of the composition from a solid to a very high viscosity, paste-like compound capable of maintaining a plurality of reinforcement fibers in suspension during the liquid phase. Then, under pressures as high as 1000–5000 psi, the compound charge is injected into a heated metal mold. If the pellet were not melted and subjected to high pressures, its solid or high viscosity state would not allow it to fill a mold and the cure. The mold is kept hot at a pre-set temperature so the compound does not set as it enters the mold, thereby preventing the mold from being completely filled as well as aiding in the cure process.

In conventional metalcasting, a solid metal is melted to a very low, almost water-like viscosity allowed to rest and then either poured or pushed into a mold, causing the molten metal's temperature to quickly drop and solidify into a part. Mold temperature is not as important and typically not even addressed with metalcasting molds. The typically operate at room temperature without any temperature controls. The molten metals' low viscosity allows the metal to quickly enter and fill the mold before solidifying. In order for a thermoplastic to behave in a similar way to molten metals and liquid thermosets, it must be put into a low viscid state as well (100–3000 cps) and kept liquid while being mixed with fibers, as shown at Block 103'. The types of fibers that can be utilized are the same as those utilized with respect to thermoset resins.

The resin mixture is allowed to rest and de-aerate as can be seen at Block 105', after which it de-aerates (Block 105'), gels (Block 107') and is poured or pushed into a metalcasting mold and allowed to solidify into a finished product form (Block 109'). Like metal, a thermoplastic resin can be either pushed or poured into a mold having a temperature that is at ambient or at least lower than the temperature of the resin mixture. The rapid cooling of the plastic article in the cooler mold cures the article instantly, just like metal. In this manner, thermoplastic resins that previously required injection and compression molding machines, and associated high pressures and added heat and steel molds, can be molded in traditional metalcasting molds. Simultaneously, reinforcement fibers which previously settled within a liquid thermoplastic composition can now be suspended for the duration of the fabrication process. This ability to maintain multiple types of reinforcement fibers in suspension is important in order to define and obtain desirable physical and performance characteristics in the completed plastic component.

In the instant invention, liquid thermoplastics have sufficient viscosity for integration with short fiber reinforcements, permitting production of the same high quality composite, structural plastic parts which have heretofore been injection and compression molded in more expensive and complicated steel molds. Most thermoplastic compositions can be put into a liquid form suitable for pouring into a mold. The resins which can be used include but are not limited to nylon, polyethylene (PE), polypropylene (PP), polyetherketone (PEK), polyamide imide (PAI), polyether imide (PEI), polyphenylenesulfide (PPS), polybenzimidazole (PBI), polsulfone (PS), polyarylethersulfone (PAS), poly(ethylene terephthalate) (PET), acetals and polycarbonate. When in a liquid state, they are, or can be put into, a low enough viscosity (i.e. 100–3,000 cps) to allow mixing with high percentages of fiber reinforcements of the types described hereinabove.

Nylon resins, of which nylon 6 is currently the only castable nylon, are often preferred over other thermoplastics because of their high cost/performance ratio. The high mechanical and thermal stability of thermoplastics is generally comparable to that of cast aluminum in the manufacture of complex production components, such as automotive air intake manifolds. The casting of nylon is a well-established art and is used primarily to produce stock shapes such as round bars and flat plates which are sold and then machined into a final design, although casting of parts to a near net shape has also been accomplished. Such parts have, to this point, been sold primarily as unfilled parts or, if filled, incorporating some type of filler other than reinforcement fibers kept in suspension as realized with the present invention.

A thermoplastic resin that is selected for a particular application must be in a liquid state. Preferred methods of producing a liquid resin include melting a pre-manufactured resin, incorporating reinforcement fibers into resin during a resin manufacturing process wherein the resin is already be in a low viscid state, or by placing the manufactured resin in an emulsion.

If using a thermoplastic such as nylon 6 in the present invention, a preferred method of use involves the addition and combination of fiber reinforcements while the nylon 6 resin is being manufactured. The process for manufacturing nylon 6 involves three components: a monomer (i.e. caprolactam), an activator and a catalyst. The typical activator is HDI-caprolactame pre-polymer and caprolactam, and the typical catalyst is aliphatic cyclic amide, sodium salt. Typical activator and catalyst ratios are 0.50–3% by weight.

Components used in the production of thermoplastic resins are often available in a solid form which must be liquefied so as to be suitable for pouring into a mold. For example. caprolactam is a monomer used principally in the manufacturing of nylon 6. One method of liquefying solid forms of caprolactam requires melting of the monomer into a liquid and then using a catalyst and activator to complete chemical transition into a flowable thermoplastic resin and ultimately a solidified part. The caprolactam must be warmed to about 69° C. before addition of the catalyst and activator (heated to about 100°C.–150° C.) along with any reinforcement fibers. The catalyst and activator complete the cure into a solid nylon 6 part without the need for high added heat or injection pressures.

Caprolactam monomer is available in a molten form and nylon casting activators can be acquired in liquid form, showing similar performance in the casting process and in the finished parts. However, all three components (monomer, activator and catalyst) are usually manufactured in a solid flake form. The activator and catalyst must be heated separately until they are in a liquid state. This is accomplished by raising the temperature of each to 100° C.–200° C. When melted to the correct temperature, the three components are mixed thoroughly and the mixture maintained at slightly higher temperatures (typically 150° C.–170° C.), until the desired degree of polymerization occurs that produces nylon 6.

In the alternative, thermoplastic powders such as those described hereinabove can be diluted with a solvent that completely dissolves the resin into the solvent or keeps them in suspension. Either method would yield a low viscosity liquid thermoplastic mixture.

As with thermoset resins, the ingredients which are used to make a resin-fiber compound or resin-fiber-catalyst compound mixture using a thermoplastic resin can be purchased separately in bulk and formed into a compound on-site. The compound, as before, is allowed to rest, deaerate and gel, all just prior to being poured into a mold. The fibers within such mixture are held in suspension due to the low viscosity of the resin, which is defined to maintain such suspension depending upon the type of fiber used therein.

The same de-aeration method described hereinabove with respect to thermoset resins can also be employed with thermoplastic resins to ensure suspension of fibers within a resinous composition, whether thermoset or thermoplastic. As the resin starts to cure (as with a thermoset) or re-solidify (as with a thermoplastic), the fibers lose their tendency to settle or congregate. Because different fibers have different corresponding weights, the viscosity of the resin, whether thermoset or thermoplastic, can be varied accordingly to keep the fibers in suspension for the duration of the gelation process (Block 107 or Block 107'). In this manner, the fibers can be dispersed throughout the resin in a desired pattern and maintained in such position until a full cure is achieved.

When selecting the polymerizable composition to be cast, thermoset resins and thermoplastic resins stand apart due to their inherently advantageous physical and performance characteristics. The creep resistance of thermosets, for example, is significantly superior to that of components formed from other resins. In addition, the enhanced chemical resistance of thermosets and thermoplastics, combined with the ability to withstand extreme environmental conditions, further enhance the attractiveness of these materials for a wide variety of applications. Although such materials are preferred, the present invention method is not limited by the types of materials enumerated herein and may be utilized with any polymerizable composition conducive to the practice thereof.

Insofar as the present method can be adapted for the fabrication of structural plastic prototypes and objects molded therefrom, the ability to take a liquid thermoset or thermoplastic resin and simply pour it into a soft tool mold such as a wax, plaster, plastic, rubber or spray metal mold is one of the quickest and least expensive ways for producing a desired prototype part. This is done routinely if all that is required is a model of the part primarily for viewing purposes. However, this technique is ineffective for visual and working models capable of physically emulating the production part. The reason for this is that these molds traditionally accommodate only low temperature resistant and low stress resins.

The mold itself may be made by first making a model or pattern of the object to be molded out of plastic or using rapid prototyping techniques. The mold is then cast in a liquid or soft formable material such as wax, plastic, rubber or spray metal or rubber soft tool molds, or one developed using rapid prototyping techniques. Additionally, the mold may be a negative of a predetermined pattern. Typical procedures include using liquid resin, such as a polyurethane mixed with a curing agent or using a liquid wax or rubber formulation such as silicone rubber mixed with a curing agent, pouring the material over the model so as to encase the model in the soft tooling material and removing the encapsulating material when it cures to a solid, the model being held in a suitable container so as to be able to be freed of the encapsulating material. These soft tool mold making techniques are well known in the art.

It is emphasized that the same method and mixture for producing prototype parts can also be used with equal economy and convenience to fabricate molds. Molds made with this process are capable of withstanding temperatures up to 400° F. This composite structural plastic mold can then be used for prototype or production run for processing materials requiring high temperatures during the molding procedure, including thermoplastics such as nylon and high temperature resistant, or structurally reinforced thermoset plastics such as phenolics and epoxies. If using a thermoset composition, curing of the liquid mixture is accomplished entirely by the catalytic action, with an exotherm being generated by the reaction between the resin and the catalyst. When the molded object is cured it is simply removed from the mold and the process may then be repeated as required.

FIGS. 8A through 8H illustrate the construction and use of a typical sand mold in conjunction with the method of the present invention. Even though the present invention method is described with reference to a sand casting procedure, it is understood that such description is for example only and in no way limits the application of the subject matter of the instant disclosure. The inventive method disclosed herein is applicable to a variety of conventional metalcasting operations, including but not limited to shell molding, diecasting, permanent molding and other such methods as described hereinabove.

Figure 8A:
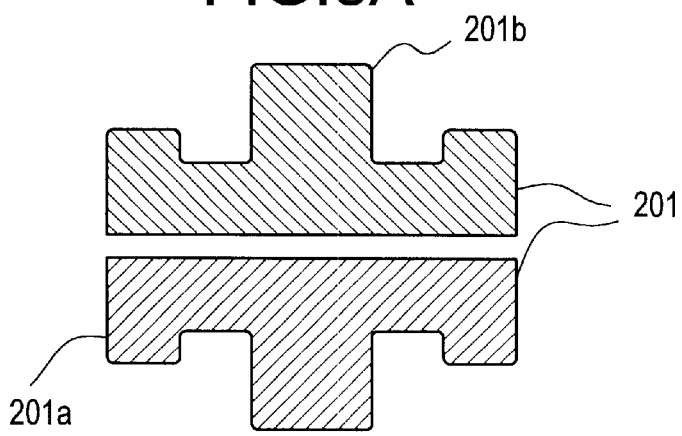
Figure 8B:
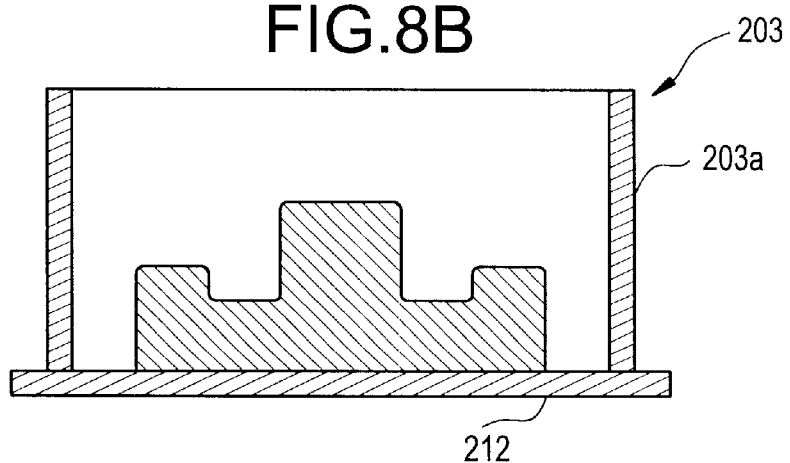
Figure 8C:
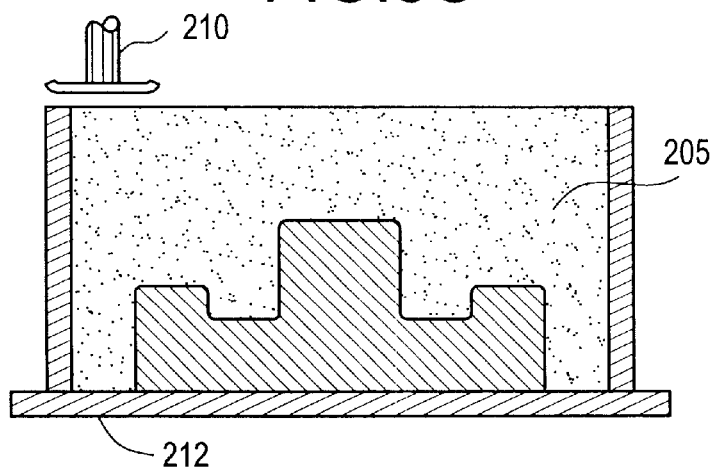

FIG. 8A shows a two-piece pattern 201 representing the object to be molded. Pattern 201 has a base portion 201*a* and a top portion 201*b*. In FIG. 8B, base portion 201*a* is inverted and shown in place in a bottom portion 203*a* of a mold box 203. Mold box 203 further includes a removable base 212 which holds shows a sand and binder mixture 205 that fills the bottom portion of the box as shown in FIG. 8C. A manual or automatic compacting means such as ram 210 compresses the sand around the base pattern 201*a*.

Figure 8D:
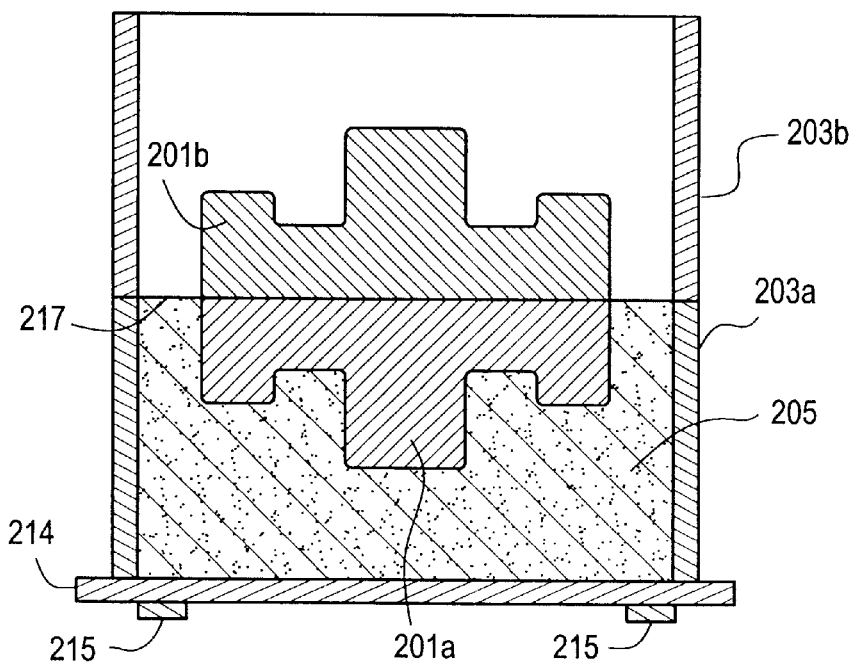

Now referring to FIG. 8D, mold box 203, along with sand 205 and base portion 201*a* therein, is inverted and base 212 is removed therefrom. The bottom portion of mold box 203 is placed on a permanent mold box base 214 having supporting feet 215. Top portion 201*b* of pattern 201 is aligned with bottom portion 201*a*, and sand 205 fills a top portion 203*b* of mold box 203 wherein top portion 201*b* is positioned to define a separation plane 217. Ram 210 is again used to compact the sand around the pattern piece.

Figure 8E:
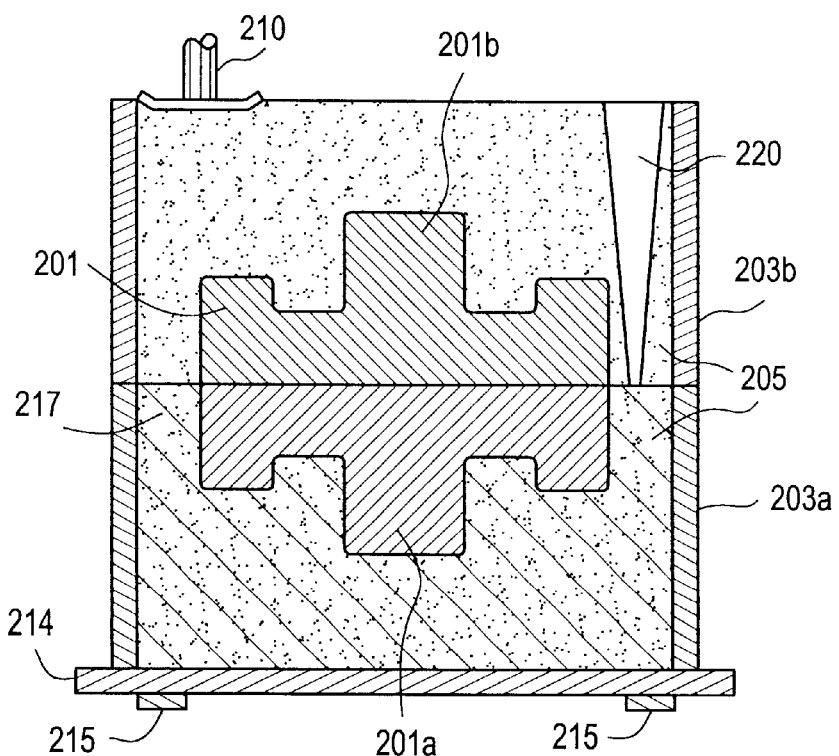
Figure 8F:
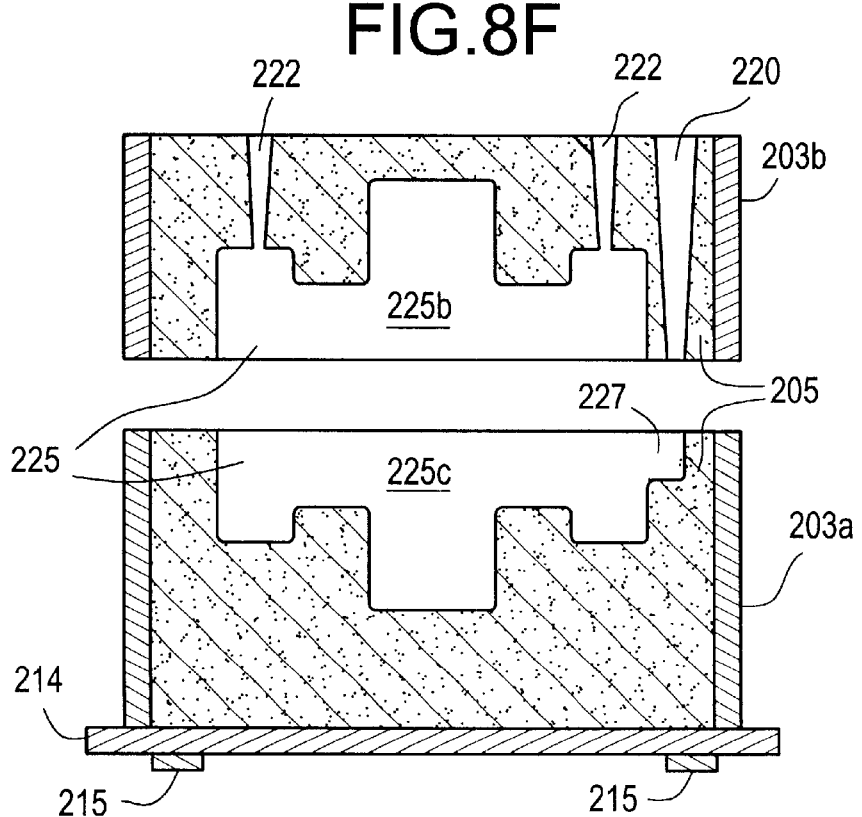
Figure 8G:
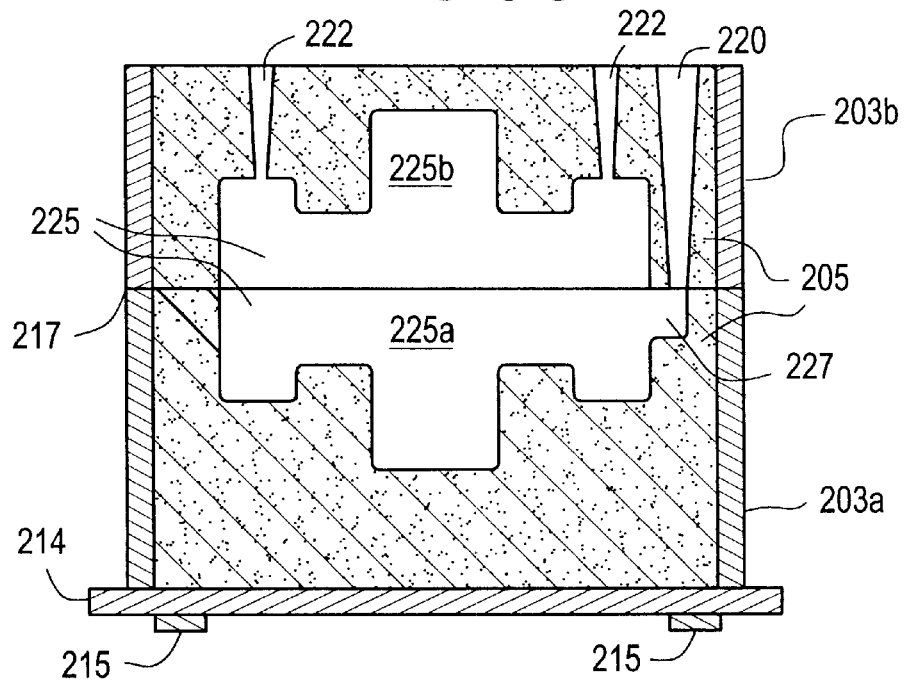

As shown in FIG. 8E, a funnel-shaped opening or sprue 220 is cut in sand 205 which extends along the width of top portion 203*b* of mold box 203. Top portion 203*b* is removed from bottom portion 203*a* along separation plane 217, as further shown in FIG. 8, thereby permitting removal of pattern 201 from the mold box. Two vent holes or risers 222 can be cut in sand 205 which extend from a top half 225*a* of empty mold configuration 225, with bottom portion 203*a* of the sand-filled mold box having a lateral cut-out 227 in the sand so as to form a channel with the funnel-shaped opening 220 in the top half of the mold box when joined. FIG. 8G shows the completely prepared mold just before pouring of the liquid resin. The two empty mold configuration halves 225*a* and 225*b* are now joined together, forming a single complete mold configuration.

The resinous mixture as described hereinabove with respect to FIGS. 7A and 7B can now be manually or automatically poured into the mold, for example, by placing the mixture into a beaker 231 as shown in FIG. 8H. The liquid mixture 233 is poured into the mold 225 with a funnel 232 placed in the correspondingly sized and shaped opening 220 in the top half of the mold. In this manner, the liquid plastic mixture fills the mold and is allowed to cure therein. Sand 205 is broken away, releasing the finished product which is a composite, structural plastic object 225'.

Wax-based cores and molds of various types other than the sand cast mold described hereinabove may be used with the present invention due to the removal of high pressure and high added heat from the conventional casting process. Such a wax core obviates shifting of the core within a molded product and enables easy and inexpensive removal thereof. The use of a hollow or solid wax core or mold not only enables recycling of materials, but, more importantly, enables melting of the core from the mold. More specifically, use of a hollow wax core enables easy removal thereof through application of vibratory motion or, alternatively, freezing of the mold to make the wax brittle and prone to fracture. Additionally, cooler temperatures within the mold itself allow the wax to shrink, making it easier to remove the core.

Various types of binders such as wax binders may also be used with the present invention, which binders extend the life of a sand cast mold beyond a single use. In conventional foundry sand casting procedures, the resin binder holding the sand together is burned off, allowing the sand to be shaken out. In the present method, since no external heat is applied or required or desired, a binder is used that breaks down/decomposes with water. Such a binder is available from Ashland Chemical Co. and Borden Chemical Co.

Reinforcement fibers in a milled or chopped strand form can be integrated with a flowable resin by effecting vibration, soaking or mixing of the fibers within the resin to effect suspension thereof. Any of these methods may be implemented to maintain the fiber in suspension until the viscosity of the resin enables the resin to independently suspend the fibers therein. For instance, milled glass fibers may be vibrated in combination with a resin into which the fibers are positioned. Once the resin attains a viscosity to suspend the fibers on its own, the vibrations cease. Although the resin's viscosity can be predicted to determine at what point fibers will remain in suspension, fillers may also be used to maintain the suspension until cure is achieved.

It is important to emphasize that at these temperatures, sufficient viscosity of the composition is attained so as to allow suspension of the fibers within the resin. During mixture and curing, such fibers remain in position for the duration of the casting procedure. The resin's viscid state prevents the fibers from settling or grouping within the resin to create undesirable fiber clumps which inhibit pouring and result in non-functional plastic components. With the present invention, the part designer can provide the definition of the component's end use and the desired performance characteristics associated therewith, and follow with a definition of a fiber dispersion pattern which ensures compliance with such goals. The dispersion pattern can be easily obtained with the resin composition and maintained therein by determining and maintaining the appropriate resin viscosity associated with the particular fiber weight (i.e. fiberglass, ceramic, etc.). Thus, the dispersion pattern is maintained in suspension until cure is attained, and the component is ready for its predicted commercial applications.

In the method of the present invention as employed in a sand casting procedure, since the high heat of molten metal is neither involved nor desired, a sand binder only has to withstand the temperature of the thermoplastics involved. Therefore, wax has proven to be a suitable binder, as well as a built-in mold release. These waxes are either paraffin-based with fillers, or polymer based using such polymers as polyethylene and polypropylene. The elimination of toxic foundry sand binders has a major impact on the metal caster since the disposal of resin sand binders is a significant environmental issue facing metal casters.

Using the aforedescribed methods, composite plastics can be cast around the same types of molds and cores used in metalcasting. Traditional injection and compression molding compounds cannot be used with the same type of metalcasting molds because they require pressure to fill the mold and extreme heat to cure the resin. Using the disclosed method, mold life is prolonged 300–500% over injection and compression molds due to lack of high pressure and high added heat. In addition, metalcasting molds are 50–300% less expensive than the hard steel tooling required by injection and compression molds.

With metalcasting, including injection and compression molding, mold release agents must be capable of withstanding high temperatures. Due to the lower temperatures encountered in the method of the present invention, although these traditional mold release agents can be employed, simple low temperature barrier coatings such as polyethylene film can be used.

Figure 9A:
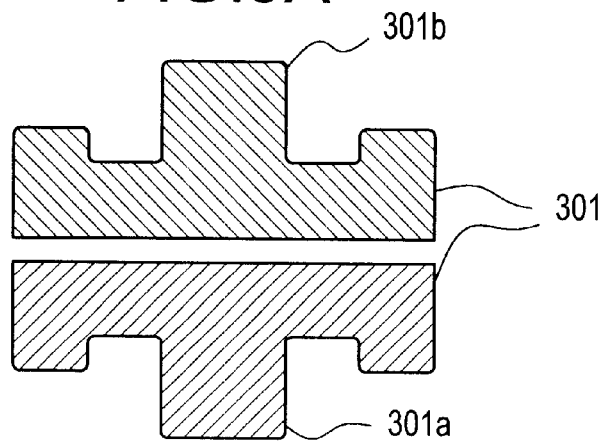
Figure 9B:
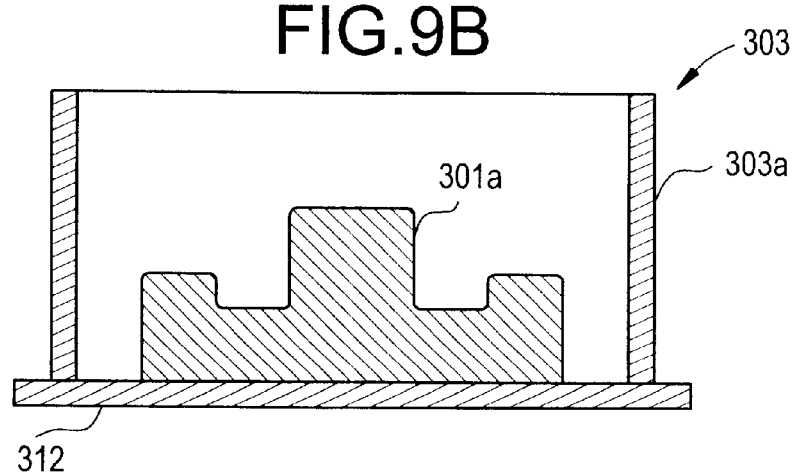

The same mixture as that taught and used with respect to FIGS. 7A and 7B can also be used to fabricate molds for similar use in prototype part fabrication or for more demanding applications requiring greater mold strength and high temperature resistance which would render typical soft tool or rapid prototyping molds unacceptable. FIGS. 9A to 9H illustrate an alternative embodiment of the present invention wherein a composite, structural plastic mold is fabricated and used to produce composite, structural plastic components therefrom. Referring to FIG. 9A, a two-piece wood or metal pattern 301 having a base portion 301a and a top portion 301b represents the object to be molded. Similar to the sand casting procedure shown and described in FIGS. 8A to 8H, base portion 301a is shown in FIG. 9B positioned in a bottom portion 303a of a mold box 303 having a removable base 312.

Figure 9C:
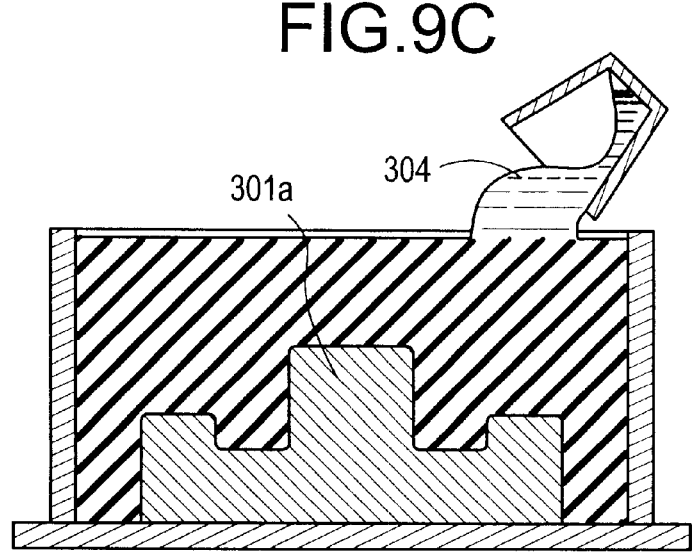
Figure 9D:
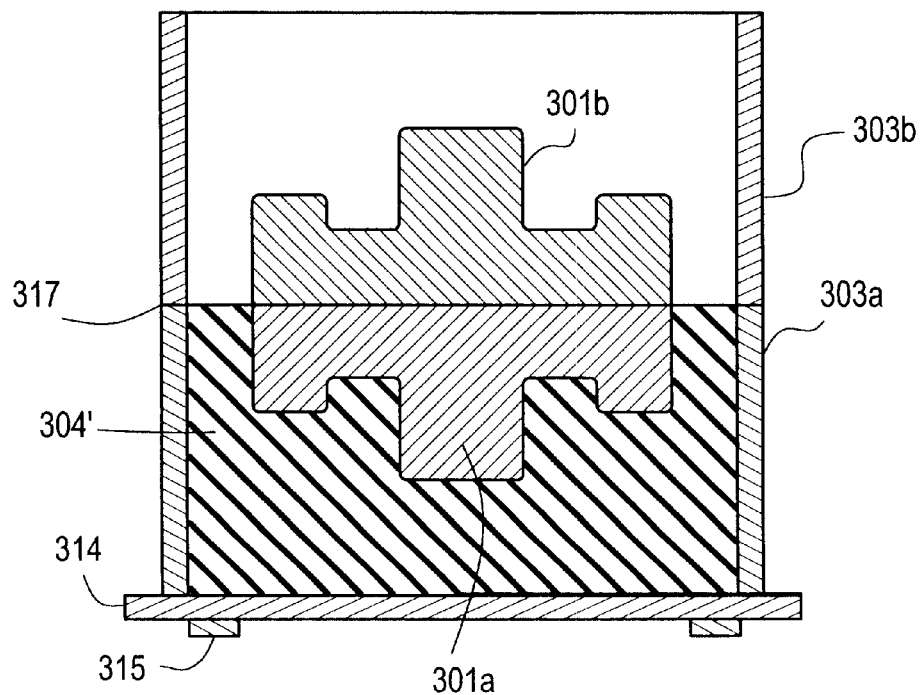
Figure 9E:
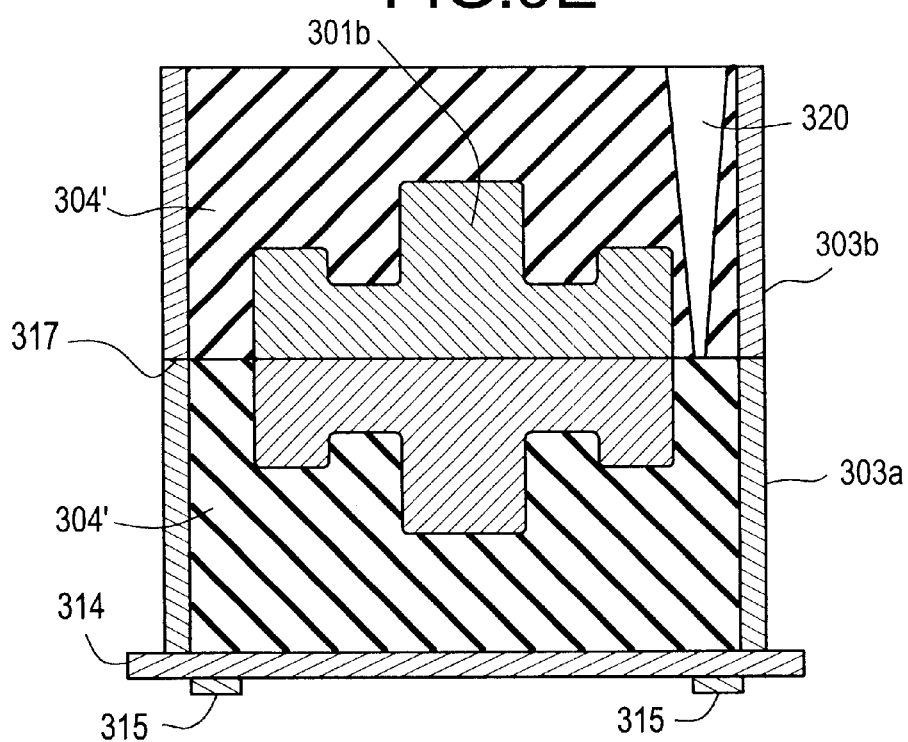
Figure 9F:
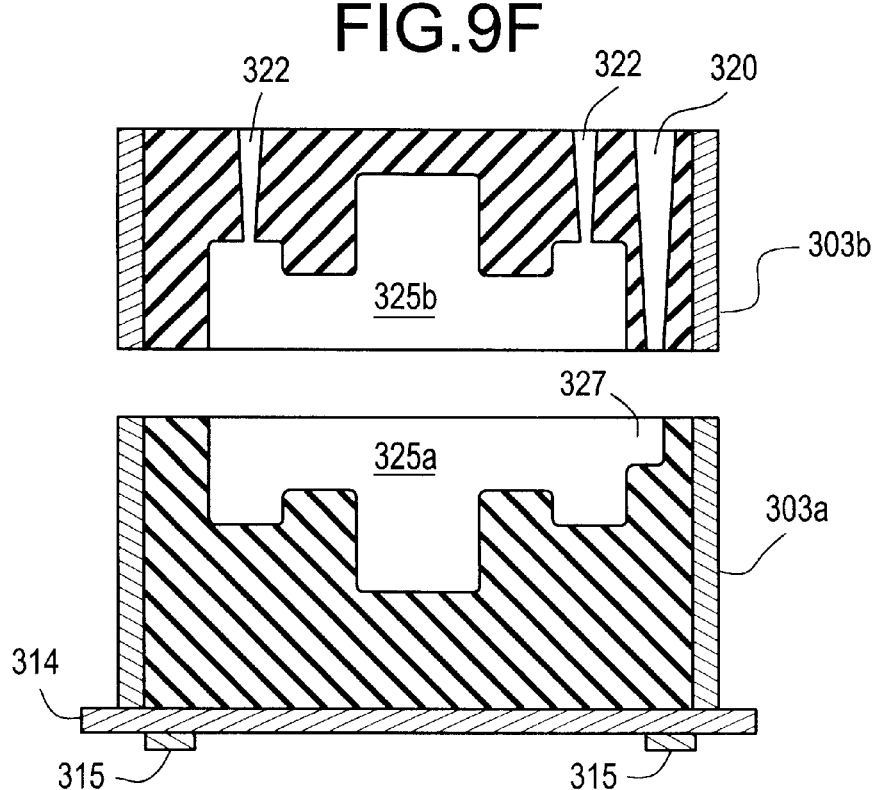

Further referring to FIG. 9C, a liquid silicone rubber-curing agent mixture 304 fills bottom portion 303a and cures. In FIG. 9D, bottom portion 303a, having base portion 301a and cured rubber 304' therein, is inverted and base 312 is removed to define a separation plane 317. The curable rubber is also used to fill top portion 303b of the mold box and cures therein as illustrated in FIG. 9E. As before, two vent holes or risers 322 can be cut into cured rubber 304' along with a lateral cut 327 so as to form a channel with the funnel-shaped opening 320.

Figure 9G:
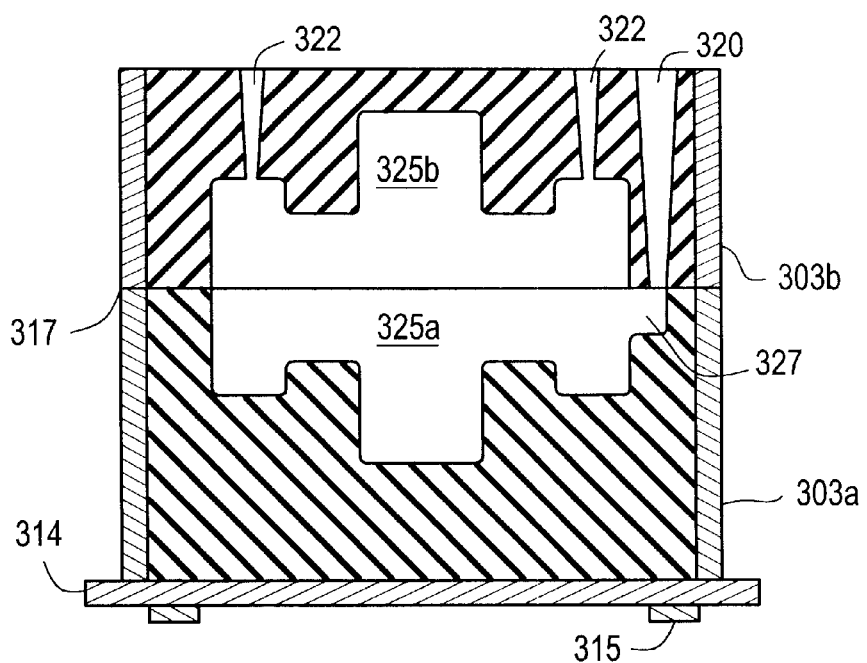

FIG. 9G shows the completely prepared mold just before pouring of the liquid resin. The two empty mold configuration pieces 325a and 325b are aligned and joined to form a single mold configuration. A resinous, fiber-reinforced mixture such as that prepared in Block 103 of Figure can now be poured into the mold from a beaker 331 into a funnel 333 through funnel opening 320.

For some applications, the prototypes part can become the commercial product, thereby obviating the need for production of a purely visual aid prior to fabrication of a functional component. The ability to remove a costly and redundant element of the concept-to-market process, namely, the production of a visual prototype upon which to base future commercial embodiments, is important to the implementation of the present invention as it relates to prototyping procedures. Elimination of the "in-between" visual aid provides options for the designer about whether to alter the current design or proceed with production with the design as is. Further confirmation of the functionality of the design can thereby be made to assist in the decision making process, without the time and costs associated with making purely visual prototypes for every alteration between initial concept and working model.

The following examples are provided to demonstrate the versatility of the present invention method for molding structural plastics and the ease with which the method can be implemented in already-existing molding and metalcasting systems. The examples are provided to emphasize these benefits and do not limit the applicability of the present invention in any way.

EXAMPLE 1

Formulation and Procedure for Utilizing the Inventive Method Using a Thermoset Resin Materials:

Resin: liquid resole phenolic resin having the formula: phenol formaldehyde polymer 70–80%; ethylene glycol 10–12%; phenol 7–10% and formaldehyde 1–3%. Resin viscosity is 500 cps.

Catalyst: p-toluene sulfonic acid, 44%; phosphoric acid 3%, ethylene glycol 53%.

Fiber: milled fiberglass

Procedure:

Mix in acid catalyst at room temperature in a 10% by weight ratio. Mix resin and catalyst together using standard paddle type mixer. Add and blend the fiberglass fiber in a volume of 30–35% by weight using the paddle. De-aerate the mixture by continuing to stir the mixture in a container. In this example, shelf life at room temperature before the mixtures becomes too viscous to pour is 10–12 minutes. Monitor the mixture temperature. Pour into a sand mold at a maximum of 130 F as mixture starts to gel. After hardening remove sand from mold. Heat treat the composite, structural plastic product at 250 F for one hour to remove residual moisture therefrom.

EXAMPLE 2

Formulation and Procedure for Utilizing the Inventive Method Using Nylon 6 When Reinforcement Fibers are Added During the Manufacturing Process Materials:

monomer: e-caprolactam catalyst: caprolactam sodium salt, i.e such as that produced under product name Bruggolen C10, a trademark of L. Bruggeman Chemical Company activator: caprolactam, i.e such as that produced under the name Bruggolen C20 (powder form) or Bruggolen C230 (liquid form), both of which are trademarks of L. Bruggeman Chemical Company fiber: 1/8" chopped fiberglass stands Procedure:

Monomer viscosity (melted) is 100 cps. The monomer in flake form is melted at 69° C. in a dry atmosphere. When the monomer is molten, add and combine in chopped fiberglass strands in a volume of 33% by weight using a paddle mixer. In a separate container, melt the activator flake at 140° C. The activator percentage should be based upon 1% by weight of caprolactam weight. In a separate container, melt the catalyst flake at 140° C. The catalyst percentage should also be 1% by weight of caprolactam weight. Combine the caprolactam/fiberglass mixture with the activator and catalyst using a standard mixer. De-aerate the mixture and monitor the temperature thereof to a maximum temperature of 100° C.–150° C. Other steps are completed as outlined in Example 1 above. No post-mold heat treatment is required. In this example, since the mold is subjected to considerably less heat than it would be with molten metals, a binder that breaks down with water or low heat may be used (i.e. a resin or wax).

EXAMPLE 3

Formulation and Procedure for Utilizing the Inventive Method for Nylon 6

When Reinforcement Fibers are Added After a Pre-Manufactured Resin is Melted

Materials:

Resin: nylon 6 in powder form. All other materials are as identified in Example 2.

Procedure:

Melt the resin to a desired viscosity of about 3000 cps at temperatures of 400° F.–700° F. Add milled fiberglass in a volume of 33% by weight of the resin and de-aerate the mixture. Slowly lower the temperature of the mixture until the precise moment when further cooling will prevent the mixture from being poured into a mold. No heat treatment is required, although the mold can be pre-heated to about 100° C.–150° C. to control cure.

Thus, a method for utilizing standard foundry molds is provided which combines the advantageous properties of structural plastics with already-existing metalcasting equipment, thereby enabling molders to meet the changing demands of manufacturers. Foundries can consider this method for replacing metal objects, as the disclosed method renders structural composite plastic products having mechanical and thermal properties superior to those of equivalent metal parts and parts produced by injection or compression molding procedures.

Furthermore, working prototypes can be produced with the same low cost and speed previously attainable only for non-functional visual prototype parts. Reinforced thermoset or thermoplastic resins are simply poured into molds made by existing techniques, producing prototype parts having equivalent visual and physical qualities to the actual part to be commercially produced. For some applications, the prototyped part can become the commercial product. The same reinforced resins can be employed to fabricate molds equivalent in convenience and economy to soft tool molds, yet possessing sufficiently enhanced temperature resistance and physical strength so as to be able to directly compete with hard tool molds for many prototype or production applications. (i.e. producing prototypes that have the same properties as the production parts in molds previously only used for the making of non-structural plastic prototype visual aids and models).

The present invention combines the desirable characteristics of composite materials with conventional, readily-available metalcasting procedures and equipment to develop and implement a successful method which permits the use of conventional metalcasting molds to fabricate composite, structural plastic prototypes and products thereby. The present invention also enables manufacture of such products thereby in an infinite number of both simple, and complex configuration, in varying lot sizes and with an optimum level of repeatability. High quality plastic components are obtained without the high pressure or heat associated with injection and compression molding, thereby negating the need for expensive steel tooling and maintenance thereof.

Various changes to the foregoing described and shown method and corresponding structures would now be evident to those skilled in the art. Accordingly, the particularly disclosed scope of the invention is set forth in the following claims.

What is claimed is:

1. A method of fabricating at least one composite structural plastic component from a flowable polymerizable composition, comprising the steps of:

a.) providing a mold selected from a group of molds used alternatively in a process for casting structural metal objects from molten metal poured therein;

b.) selecting a flowable polymerizable composition;

c.) combining said flowable composition with a plurality of short reinforcement fibers into a flowable mixture;

d.) de-aerating said mixture for a time sufficient to lower viscosity of said composition so as to simultaneously retain pourability of said mixture and sufficiently cure and suspend said fibers in said composition;

e.) pouring said mixture into said mold;

f.) curing said composition so as to form a composite structural plastic component thereby; and g.) removing said component from said mold.

2. The method of claim 1 wherein said metalcasting process is selected from the group consisting of an expendable mold process using a permanent pattern, an expendable permanent pattern process and a permanent mold process.

3. The method of claim 2 wherein said expendable mold process using a permanent pattern is selected from the group consisting of green sand molding and shell molding.

4. The method of claim 2 said expendable pattern process is selected from the group consisting of lost foam casting and investment casting.

5. The method according to claim 2 wherein said permanent mold process is selected from the group consisting of diecasting and permanent mold casting.

6. The method of claim 1 wherein said flowable composition is a thermoset resin.

7. The method of claim 6 wherein said thermoset resin is selected from the group consisting of unsaturated polyester, phenolic, epoxy, urethane and vinyl ester resins.

8. The method of claim 6 further comprising the step of combining said mixture, with a catalyst.

9. The method of claim 8 wherein said catalyst is selected from the group consisting of toluene sulfonic acid and phosphoric acid.

10. The method of claim 6 further comprising the post-mold step of curing said thermoset resin after said removing step.

11. The method of claim 1 wherein said composition is a thermoplastic resin.

12. The method of claim 11 wherein said thermoplastic resin is selected from the group consisting of nylon, polyethylene, polypropylene, polyetherketone, polyamide imide, polyether imide, polyphenylenesulfide, polybenzimidazole, polysulfone, polyarylether sulfone, poly (ethylene terephthalate), acetals and polycarbonate.

13. The method of claim 11 further comprising the step of maintaining said thermoplastic resin in a low viscid state for a time sufficient to combine said thermoplastic resin with said reinforcement fibers.

14. The method of claim 1 wherein said reinforcement fibers are selected from the group of milled or flaked fibers consisting of fiberglass, graphite, polyaromatic amides or ceramics.

15. The method of claim 14 wherein said reinforcement fibers have a length of length of $\frac{1}{16}$".

16. The method of claim 14 wherein said reinforcement fibers have a length of $\frac{1}{8}$".

17. The method of claim 14 wherein said reinforcement fibers have a length of $\frac{1}{4}$".

18. The method of claim 14 wherein said reinforcement fibers have a width of about 10 microns to 40 microns, inclusive.

19. The method of claim 18 wherein said reinforcement fibers have a width of about 10 microns.

20. The method of claim 1 wherein said de-aeration step includes putting said composition resin into a low viscosity state.

21. The method of claim 20 wherein said fibers are placed in suspension in said low viscosity resin.

22. The method of claim 1 further comprising the step of fabricating said mold.

23. A method of casting at least one composite structural plastic component from a flowable polymerizable composition, comprising the steps of:
  a.) providing a mold selected from a group of molds used alternatively in a process for casting structural metal objects from molten metal poured therein;
  b.) selecting a flowable polymerizable composition;
  c.) combining said flowable composition with a plurality of short reinforcement fibers into a flowable mixture;
  d.) bringing said resin to a viscosity sufficient to achieve and maintain suspension of said reinforcement fibers in said composition;
  e.) pouring said mixture into said mold;
  f.) curing said composition so as to form a composite structural plastic component thereby; and
  g.) removing said component from said mold.

24. The method of claim 23 wherein said metalcasting process is selected from the group consisting of an expendable mold process using a permanent pattern, an expendable pattern process and a permanent mold process.

25. The method of claim 24 wherein said expendable mold process using a permanent pattern is selected from the group consisting of green sand molding and shell molding.

26. The method of claim 24 said expendable pattern process is selected from the group consisting of lost foam casting and investment casting.

27. The method of claim 24 wherein said permanent mold process is selected from the group consisting of diecasting and permanent mold casting.

28. The method of claim 23 wherein said flowable composition is a thermoset resin.

29. The method of claim 28 wherein said thermoset resin is selected from the group consisting of unsaturated polyester, phenolic, epoxy, urethane and vinyl ester resins.

30. The method of claim 28 further comprising the step of combining said mixture with a catalyst.

31. The method of claim 30 wherein said catalyst is selected from the group consisting of toluene sulfonic acid and phosphoric acid.

32. The method of claim 28 further comprising the post-mold step of curing said thermoset resin after said removing step.

33. The method of claim 23 wherein said composition is a thermoplastic resin.

34. The method of claim 33 wherein said thermoplastic resin is selected from the group consisting of nylon, polyethylene, polypropylene, polyetherketone, polyamide imide, polyether imide, polyphenylenesulfide, polybenzimidazole, polysulfone, polyarylether sulfone, poly (ethylene terephthalate), acetals and polycarbonate.

35. The method of claim 33 further comprising the step of maintaining said thermoplastic resin in a low viscid state for a time sufficient to combine said thermoplastic resin with said reinforcement fibers.

36. The method of claim 23 wherein said reinforcement fibers are selected from the group of milled or flaked fibers consisting of fiberglass, graphite, polyaromatic amide or ceramics.

37. The method of claim 36 wherein said reinforcement fibers have a length of length of $\frac{1}{16}$".

38. The method of claim 36 wherein said reinforcement fibers have a length of $\frac{1}{8}$".

39. The method of claim 36 wherein said reinforcement fibers have a length of $\frac{1}{4}$".

40. The method of claim 36 wherein said reinforcement fibers have a width of about 10 microns to 40 microns, inclusive.

41. The method of claim 40 wherein said reinforcement fibers have a width of about 10 microns.

42. The method of claim 23 wherein said structural plastic component includes an intake manifold.

43. The method of claim 23 further comprising the step of fabricating said mold.

44. A method of fabricating composite, structural parts, comprising the steps of:
  a.) providing a soft tool mold having a pre-defined cavity therein conforming to a structural part configuration;
  b.) selecting a flowable polymerizable composition;
  c.) combining said flowable composition with a plurality of short reinforcement fibers into a flowable mixture;
  d.) bringing said composition to a viscosity sufficient to maintain suspension of said reinforcement fibers therein;
  e.) pouring said composition into said cavity;
  f) allowing said mixture to cure into a solid composite structural plastic part, and g.) removing said structural part from said mold.

45. The method of claim 44 wherein said soft tool mold is formed from a material selected from the group consisting of wax, rubber, plastic or spray metal.

46. The method of claim 44 wherein said flowable composition is a thermoset resin.

47. The method of claim 46 wherein said thermoset resin is selected from the group consisting of unsaturated polyester, phenolic, epoxy, urethane and vinyl ester resins.

48. The method of claim 46 further comprising the step of combining said mixture with a catalyst.

49. The method of claim 48 wherein said catalyst is selected from the group consisting of toluene sulfonic acid and phosphoric acid.

50. The method of claim 46 further comprising the step of curing said thermoset resin after said removing step.

51. The method of claim 44 wherein said composition is a thermoplastic resin.

52. The method of claim 51 wherein said thermoplastic resin is selected from the group consisting of nylon, polyethylene, polypropylene, polyetherketone, polyamide imide, polyether imide, polyphenylenesulfide, polybenzimidazole, polysulfone, polyarylether sulfone, poly (ethylene terephthalate), acetals and polycarbonate.

53. The method of claim 51 further comprising the step of maintaining said thermoplastic resin in a low viscid state for a time sufficient to combine said thermoplastic resin with said reinforcement fibers.

54. The method of claim 44 wherein said reinforcement fibers are selected from the group of milled or flaked fibers consisting of fiberglass, graphite, polyaromatic amides or ceramics.

55. The casting method of claim 54 wherein said reinforcement fibers have a length of length of ¹⁄₁₆".

56. The method of claim 54 wherein said reinforcement fibers have a length of ⅛".

57. The method of claim 54 wherein said reinforcement fibers have a length of ¼".

58. The method of claim 54 wherein said reinforcement fibers have a width of about 10 microns to 40 microns, inclusive.

59. The method of claim 58 wherein said reinforcement fibers have a width of about 10 microns.

60. The method of claim 44 wherein said structural parts include at least one intake manifold.

61. The method of claim 44 further comprising the step of providing an extractable core.

62. The method of claim 61 wherein said core is selected from the group of materials consisting of waxes, sands and soluble metals.

63. The method of claim 62 wherein said wax core is selected from the group consisting of solid and hollow wax cores.

64. The method of claim 62 wherein said sand core includes a binder.

65. The method of claim 64 wherein said binder is a wax binder.

66. A method of fabricating composite, structural parts, comprising the steps of:
   a.) providing a mold having a pre-defined cavity therein conforming to a structural part configuration;
   b.) selecting a flowable polymerizable composition;
   c.) combining said flowable composition with a plurality of short reinforcement fibers into a flowable mixture;
   d.) bringing said composition to a viscosity sufficient to maintain suspension of said reinforcement fibers therein;
   e.) pouring said composition into said cavity;
   f.) allowing said mixture to cure into a solid composite structural plastic part, and
   g.) removing said structural part from said mold.

67. The method of claim 66 wherein said mold is metalcasting mold selected from a group of molds used alternatively in a process for casting structural metal objects from molten metal poured therein.

68. The method of claim 67 wherein said metalcasting process is selected from the group consisting of an expendable mold process using a permanent pattern, an expendable pattern process and a permanent mold process.

69. The method of claim 68 wherein said expendable mold process using a permanent pattern is selected from the group consisting of green sand molding and shell molding.

70. The method of claim 68 said expendable pattern process is selected from the group consisting of lost foam casting and investment casting.

71. The method of claim 68 wherein said permanent mold process is selected from the group consisting of diecasting and permanent mold casting.

72. The method of claim 66 wherein said flowable composition is a thermoset resin.

73. The method of claim 72 wherein said thermoset resin is selected from the group consisting of unsaturated polyester, phenolic, epoxy, urethane and vinyl ester resins.

74. The method of claim 72 further comprising the step of combining said mixture with a catalyst.

75. The method of claim 74 wherein said catalyst is selected from the group consisting of toluene sulfonic acid and phosphoric acid.

76. The method of claim 72 further comprising the post-mold step of curing said thermoset resin after said removing step.

77. The method of claim 66 wherein said composition is a thermoplastic resin.

78. The method of claim 77 wherein said thermoplastic resin is selected from the group consisting of nylon, polyethylene, polypropylene, polyetherketone, polyamide imide, polyether imide, polyphenylenesulfide, polybenzimidazole, polysulfone, polyarylether sulfone, poly (ethylene terephthalate), acetals and polycarbonate.

79. The method of claim 77 further comprising the step of maintaining said thermoplastic resin in a low viscid state for a time sufficient to combine said thermoplastic resin with said reinforcement fibers.

80. The method of claim 66 wherein said reinforcement fibers are selected from the group of milled or flaked fibers consisting of fiberglass, graphite, polyaromatic amides or ceramics.

81. The casting method of claim 80 wherein said reinforcement fibers have a length of length of ¹⁄₁₆".

82. The method of claim 80 wherein said reinforcement fibers have a length of ⅛".

83. The method of claim 80 wherein said reinforcement fibers have a length of ¼".

84. The method of claim 80 wherein said reinforcement fibers have a width of about 10 microns to 40 microns, inclusive.

85. The method of claim 84 wherein said reinforcement fibers have a width of about 10 microns.

86. The method of claim 66 further comprising the step of fabricating said mold.

* * * * *